US012330275B2

(12) United States Patent

Ward et al.

(10) Patent No.: US 12,330,275 B2

(45) Date of Patent: *Jun. 17, 2025

(54) CONCENTRATED LONGITUDINAL ACOUSTICAL/ULTRASONIC ENERGY FASTENER DESIGN AND MANIPULATION SYSTEM

(71) Applicant: NEXTGEN AEROSPACE TECHNOLOGIES, LLC, Troy, OH (US)

(72) Inventors: Gary Lee Ward, Pleasant Hill, OH (US); David Scott Diwinsky, West Chester, OH (US); David Joseph Stone, Dayton, OH (US); Marc Alan Metz, Enon, OH (US); Tom Lawrence Clutter, Tipp City, OH (US)

(73) Assignee: NextGen Aerospace Technologies, LLC, Troy, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,183

(22) Filed: Dec. 5, 2023

(65) Prior Publication Data

US 2024/0109169 A1 Apr. 4, 2024

Related U.S. Application Data

(63) Continuation of application No. 17/324,770, filed on May 19, 2021, now Pat. No. 11,890,728.

(51) Int. Cl.

*B25B 21/02* (2006.01)
*B25B 23/00* (2006.01)

(52) U.S. Cl.

CPC ............ *B25B 21/023* (2013.01); *B25B 23/00* (2013.01)

(58) Field of Classification Search

CPC ....... B25B 21/00; B25B 21/023; B25B 23/00; B25B 23/12; B25D 11/064; A61B 17/1624; A61B 17/8875; A61B 17/8886; A61C 1/07; A61C 17/20; B06B 1/00; B06B 3/00; G10K 11/004; F16B 23/00; F16B 31/00

See application file for complete search history.

(56) References Cited

U.S. PATENT DOCUMENTS

| | | | | |
|---|---|---|---|---|
| 1,882,399 A | | 10/1932 | Pierce | |
| 2,220,711 A | | 11/1940 | Fitch | |
| 2,539,678 A | | 1/1951 | Thomas | |
| 2,616,223 A | | 11/1952 | Jonker | |
| 2,623,427 A | * | 12/1952 | Ornstein | B25B 13/481 81/3.43 |
| 2,834,158 A | | 5/1958 | Petermann | |
| 2,967,302 A | | 1/1961 | Loveless | |
| 2,982,255 A | | 5/1961 | Klenck | |

(Continued)

FOREIGN PATENT DOCUMENTS

| | | |
|---|---|---|
| CN | 101041233 | 9/2007 |
| GB | 2483072 | 2/2012 |

(Continued)

*Primary Examiner* — Robert J Scruggs

(74) *Attorney, Agent, or Firm* — Jacox, Meckstroth & Jenkins

(57) ABSTRACT

A system and method and fastening tool that utilizes ultrasonic or acoustic energy and a horn that focuses the energy into the fastener at a predetermined location in order to facilitate tightening or loosening the fastener.

76 Claims, 14 Drawing Sheets

(56) References Cited

U.S. PATENT DOCUMENTS

| | | | |
|---|---|---|---|
| 3,208,134 A | 9/1965 | Krewson, Jr. | |
| 3,368,085 A * | 2/1968 | Dettloff | B06B 3/00 59/51 |
| 3,485,307 A | 12/1969 | Riley, Jr. et al. | |
| 3,521,348 A * | 7/1970 | Jones | B25B 21/00 228/1.1 |
| 3,861,250 A | 1/1975 | Zugai | |
| 4,728,843 A | 3/1988 | Mishiro | |
| 4,771,661 A | 9/1988 | Levchenko et al. | |
| 4,807,349 A | 2/1989 | Blackmore | |
| 4,812,697 A | 3/1989 | Mishiro | |
| 4,958,541 A | 9/1990 | Annis et al. | |
| 4,965,482 A | 10/1990 | Ohnishi et al. | |
| 5,083,358 A | 1/1992 | Jones et al. | |
| 5,774,978 A | 7/1998 | Ishii | |
| 6,204,592 B1 * | 3/2001 | Hur | A61C 1/07 310/323.12 |
| 6,421,902 B1 | 7/2002 | Loffler | |
| 6,681,663 B1 | 1/2004 | Hsien | |
| 7,392,727 B1 * | 7/2008 | Chiang | B25B 23/12 173/132 |
| 11,890,728 B2 * | 2/2024 | Ward | B25B 23/14 |
| 2007/0157736 A1 * | 7/2007 | Kawano | B23P 19/065 73/761 |
| 2007/0193420 A1 | 8/2007 | Van Baal | |
| 2007/0289759 A1 | 12/2007 | Hartmann et al. | |
| 2008/0134845 A1 | 6/2008 | Shiao | |
| 2009/0066192 A1 | 3/2009 | Taki et al. | |
| 2009/0208308 A1 | 8/2009 | Kawano et al. | |
| 2009/0229846 A1 | 9/2009 | Kawano et al. | |
| 2012/0024553 A1 | 2/2012 | Speranza | |
| 2012/0292367 A1 | 11/2012 | Morgan et al. | |
| 2013/0192389 A1 | 8/2013 | Carlin et al. | |
| 2014/0069240 A1 | 3/2014 | Dauvin et al. | |
| 2014/0284371 A1 | 9/2014 | Morgan et al. | |
| 2014/0296873 A1 | 10/2014 | Morgan et al. | |
| 2014/0296874 A1 | 10/2014 | Morgan et al. | |
| 2014/0303645 A1 | 10/2014 | Morgan et al. | |
| 2014/0303646 A1 | 10/2014 | Morgan et al. | |
| 2015/0041169 A1 | 2/2015 | Kumagai et al. | |
| 2016/0256229 A1 | 9/2016 | Morgan et al. | |
| 2016/0262745 A1 | 9/2016 | Morgan et al. | |
| 2017/0196558 A1 | 7/2017 | Morgan et al. | |
| 2017/0238928 A1 | 8/2017 | Morgan et al. | |
| 2017/0311944 A1 | 11/2017 | Morgan et al. | |
| 2017/0319201 A1 | 11/2017 | Morgan et al. | |
| 2017/0333034 A1 | 11/2017 | Morgan et al. | |
| 2017/0333035 A1 | 11/2017 | Morgan et al. | |
| 2019/0105036 A1 | 4/2019 | Morgan et al. | |
| 2019/0105037 A1 | 4/2019 | Morgan et al. | |
| 2019/0105039 A1 | 4/2019 | Morgan et al. | |
| 2019/0120275 A1 * | 4/2019 | Junkers | F16B 43/00 |
| 2019/0290264 A1 | 9/2019 | Morgan et al. | |
| 2019/0343515 A1 | 11/2019 | Morgan et al. | |
| 2020/0246187 A1 * | 8/2020 | Yan | A61F 9/00745 |
| 2020/0367886 A1 | 11/2020 | Shelton, IV et al. | |
| 2021/0085313 A1 | 3/2021 | Morgan et al. | |

FOREIGN PATENT DOCUMENTS

| | | |
|---|---|---|
| GB | 2512320 | 10/2014 |
| WO | 2006/025736 | 3/2006 |
| WO | 2016/176518 | 11/2016 |

* cited by examiner

CONCENTRATED LONGITUDINAL ACOUSTICAL/ULTRASONIC ENERGY FASTENER DESIGN AND MANIPULATION SYSTEM

CROSS-REFERENCE TO RELATED APPLICATIONS

The present application is a continuation of U.S. application Ser. No. 17/324,770, filed May 19, 2021. This application is incorporated herein by reference and made a part hereof.

BACKGROUND OF THE INVENTION

1. Field of the Invention

This invention relates to a system and method for loosening or fastening a fastener using ultrasonic or acoustic energy. This invention also relates to an optimal fastener design feature to accept ultrasonic or acoustic energy.

2. Description of the Related Art

Various devices for loosening a threaded connection are known from U.S. Pat. Nos. 3,485,307; 3,861,250; 4,771,661; 4,807,349: 4,812,697; 5,083,358; 6,681,663 and U.S. Publication Nos. 2007/0193420; 2009/0229846 and 2012/0024553. As shown, many relate to vibrations/impact mechanisms that are driven by various means, such as compressed air. It is generally known to persons skilled in the art, especially in the automotive, engine, and airplane technology industries, that fasteners, screws, nuts, or bolts are oftentimes seized and are difficult to remove from the part. This is due to a number of factors, such as corrosion occurring between the threads of the fasteners, screws, nuts, or bolts and the threads of the structure to which they are threadably mounted. In some applications, carbon deposits and foreign debris can build up and slowly "eat away" at the various metals, such as aluminum, titanium, and steel. When fasteners, screws, nuts, or bolts are unloosened, there is a risk of the fastener head and/or nut breaking during removal, leaving the remaining fastener in the threaded opening.

Although most attention is paid to the problem of loosening a sticking connection, and in particular threaded connections, until now none of the cited solutions have proven adequate in the airplane engine industry and/or other industries (such as heavy industrial or automotive) to replace or remove fasteners, screws, nuts, or bolts with a high success rate (i.e. without the fasteners, screws, nuts, or bolts breaking during removal procedure) especially in locations that are subject to severe conditions (i.e. high temperatures, large thermal gradience, corrosion by salt or dissimilar metals, and/or environmental sand/dust). Also, during the repeated heating and cooling cycling the parts grow and shrink at different rates which causes increased strain on the fastener which increases the likelihood of the fastener getting stuck.

There is, therefore, a need for further improvements and to provide further systems and tools particularly for loosening stuck fasteners, screws, nuts, and bolts.

The current available fastener designs are not optimized to receive acoustical or ultrasonic energies. What is also needed, therefore, is an improved design that facilitates acoustical or ultrasonic energy transfer to maximize the energy into the fastener.

While some of the prior art focuses on subjecting the sticking connection to axial and rotational vibrations, such as by an impact wrench and/or hammer, there is a need to provide an improved focused system and tool that increases the chances of successfully removing the fasteners, screws, nuts, and bolts.

What is needed, therefore, is an improved system, tool and method for overcoming one or more of the problems with the prior art tools of the past.

SUMMARY OF THE INVENTION

One object of the invention is to provide a system and fastening tool that is adapted to loosen or tighten a fastener using focused acoustic or ultrasonic energy.

Another object of the invention is to provide a system and method and a horn that is adapted and sized to transfer focused ultrasonic or acoustic energy to a predetermined location in the fastener.

Another object of the invention is to provide a plurality of horns each of which comprises of a socket, screwdriver bit, and/or torque bit that generally have and optimized geometry and or flat areas for performing work on a fastener.

Another object of the invention is to provide a fastening tool and system that utilizes an acoustic/ultrasonic generator for generating ultrasonic or acoustic energy that travels into the fastener and becomes concentrated or focused at a predetermined location in the fastener.

Still another object of the invention is to provide a rotational torque applicator that may be used substantially simultaneously as the ultrasonic or acoustic generator to further facilitate loosening or tightening the fastener.

Another object of the invention is to provide the ability to cycle/alternate between tightening and loosening to facilitate freeing the fastener by breaking up debris and corrosion.

Yet another object of the invention is to provide an ultrasonic or acoustic generator and horn that generates cyclic heating between the threads of the fastener and the threads of a structure that threadably receives the fastener.

Yet another object of the invention is to stretch the fastener with ultrasonic or acoustical energy which in turn raises the fastener head or nut from the surface structure.

Still another object of the invention is to provide a system and fastening tool that decreases the "break away torque or breaking force" necessary to loosen a fastener.

Still another object of the invention is to provide a system and method wherein the ultrasonic or acoustic energy is focused at a predetermined location in the fastener.

Another object of the invention is to provide a system and fastening tool wherein the predetermined targeted location is between the head and/or nut and its mating structure surface(s) along with the mating threads of the fastener and structure(s).

Still another object of the invention is to provide a horn having a horn body that either has a socket, screwdriver bit, and/or torque bit on its end or a threaded aperture adapted to receive at least one of a plurality of replaceable tips that are removably and threadably mounted to the horn body.

Yet another object of the invention is to provide a plurality of interchangeable or replaceable tips for mounting on a horn, wherein the plurality of interchangeable or replaceable tips comprise different shapes or sizes to accommodate fasteners of different shapes or sizes.

Another object of the invention is to provide a horn body that is threaded that receives at least one of the plurality of interchangeable or replaceable tips comprising mating threads and where a thread direction of the horn body threads being a direction or handedness that is generally the opposite thread direction of the threads of the fastener.

Another object of the invention is to provide a horn with at least one of the plurality of interchangeable or replaceable tips that is adapted to cause an acoustic energy in the fastener that results in a vortex or helical energy being applied to the fastener in a predetermined direction.

Yet another object of the invention is to provide a system and tool that may comprise of at least one energy transfer facilitator that may comprise but not limited to Teflon, oil, water, gel, foam, glycol, glycerin, and/or a polymer film or a non-energy absorbing spacer.

In one aspect, one embodiment of the invention comprises a fastener tool for loosening or tightening a fastener mounted on a structure, the fastener tool comprising a tool body; a horn adapted and sized to apply an acoustic or ultrasonic energy into the fastener; and an acoustic/ultrasonic generator for generating the acoustic or ultrasonic energy that passes through the horn and into the fastener to facilitate fastening or loosening the fastener. These all may be individual components or can be integrated into an inseparable assembly.

In another aspect, another embodiment of the invention comprises a system for rotating a fastener that is fastened to a structure; the system comprising an acoustic/ultrasonic wave generator for generating an acoustic/ultrasonic signal that passes longitudinally through the fastener to elongate the fastener and to introduce a cyclic strain and heating within the fastener to reduce a frictional force between threads on the fastener and mating threads on the structure; a tool having a horn for transmitting the acoustic/ultrasonic signal into the fastener; and wherein the acoustic/ultrasonic wave generator and the horn cooperate to focus or apply the acoustic/ultrasonic signal a predetermined distance into the fastener in order to reduce a coefficient of friction between the fastener and the structure when the horn is in operative relationship with the fastener and the acoustic/ultrasonic signal is applied thereto.

Another aspect of this invention is to provide the acoustic or ultrasonic energy via a liquid or gel transfer (e.g., water, glycol) agent from the horn and/or generator that may be delivered through a transfer tube like component directly to the bolt/screw head and/or nut which in turn delivers the ultrasonic or acoustic energy to the predetermined location in the fastener. This is especially useful in difficult to reach and minimal clearance applications where a direct horn application is not feasible.

This invention, including all embodiments shown and described herein, could be used alone or together and/or in combination with one or more of the features covered by one or more of the following list of features:

- The fastener tool wherein the horn comprises a generally optimized geometry and or flat surface for applying the acoustic or ultrasonic energy to the fastener.
- The fastener tool wherein the fastener comprises an end that is directly or indirectly engaged by the horn during loosening or fastening when the acoustic or ultrasonic energy is applied thereto, the acoustic/ultrasonic generator generating the ultrasonic or acoustic energy that travels into the fastener and becomes concentrated or focused at a predetermined location in the fastener.
- The fastener tool wherein the fastener tool comprises a rotational torque applicator for applying a rotational torque to the fastener while the ultrasonic or acoustic energy passes into the fastener; wherein the rotational torque is at least one of mechanical torque or an acoustic/ultrasonic torque that is applied substantially simultaneously as the horn causes the acoustic or ultrasonic energy to pass into the fastener.
- The fastener tool wherein the horn is adapted to apply the rotational torque substantially simultaneously as the ultrasonic or acoustic energy passes into the fastener.
- The fastener tool wherein the horn comprises a socket, screwdriver bit, and/or torque bit sized and adapted to receive a head and/or nut of the fastener with any geometric shape.
- The fastener tool wherein the end comprises a head and/or nut that engages the structure at a head and/or nut engagement area of the structure when the fastener is mounted thereto, the predetermined location being in the fastener and under the mating surface of the bolt/screw head and/or nut and the structure.
- The fastener tool wherein the end comprises a head and/or nut that becomes situated at a head and/or nut engagement area of the structure when the fastener is mounted thereto, the predetermined location being in the fastener and under the mating surface of the bolt/screw head and/or nut and the structure, such that when the ultrasonic or acoustic energy is applied to the fastener, a friction or pressure between the head and/or nut and its mating surface(s) along with the mating threads of the fastener and structure(s) is at least partly reduced.
- The fastener tool wherein the fastener comprises threads that mate with mating threads at a thread-engagement location, the predetermined location is applied under the bolt/screw head or nut and to the mating threads of the bolt/screw and the mating threads of the structure.
- The fastener tool wherein the predetermined targeted location is between the head and/or nut and its mating structure surface(s) along with the mating threads of the fastener and structure(s).
- The fastener tool wherein the acoustic/ultrasonic generator applies the ultrasonic or acoustic energy.
- The fastener tool wherein the fastener has a head and/or nut, the horn being adapted and sized to receive or engage the head and/or nut to apply a tightening or loosening torque to the head and/or nut when the acoustic/ultrasonic energy passes therethrough.
- The fastener tool wherein the horn comprises a socket, screwdriver bit, and/or torque bit that is sized and adapted to engage the head and/or nut and apply a rotational torque when the ultrasonic or acoustic energy passes into the fastener.
- The fastener tool wherein the fastener tool comprises a plurality of horns that are sized and adapted for a plurality of fasteners that have a plurality of heads, respectively, of different shapes or sizes.
- The fastener tool wherein the horn is configured or adapted to receive a plurality of sockets, screwdriver bits, and/or torque bits of different sizes so that the horn may be used to apply the ultrasonic or acoustic energy directly into and through the socket, screwdriver bit, and/or torque bit and into the fastener when the fastener is being tightened or loosened.
- The fastener tool wherein the horn comprises a horn body; with one or more replaceable tip(s) removably coupled to the horn body.
- The fastener tool wherein the fastener tool comprises a plurality of interchangeable or replaceable tips of different shapes or sizes to accommodate fasteners of different shapes or sizes, respectively, with one or more replaceable tips being selected from the plurality of interchangeable or replaceable tips.

The fastener tool wherein the horn body comprises a plurality of replaceable tips to accommodate fasteners of different sizes.

The fastener tool wherein the horn body is threaded and at least one replaceable tip comprises mating threads, a thread direction of the horn body threads being a direction opposite a thread direction of threads of the fastener. Additionally, the horn body may be threaded with a substantially larger diameter such that the threaded fastener will rotate before the horn body attachment.

The fastener tool wherein at least one of the plurality of interchangeable or replaceable tips comprises a generally optimized geometry and or flat fastener-engaging surface.

The fastener tool wherein at least one of the plurality of interchangeable or replaceable tips is adapted to cause the acoustic or ultrasonic energy to cause a vortex or helical energy to be applied internally to the fastener, the vortex or helical energy being in a predetermined direction.

The fastener tool wherein the predetermined direction is at least one of opposite thread direction of threads on the fastener when loosening the fastener or the thread direction is the same as thread direction of threads when it is desired to tighten the fastener.

The fastener tool wherein the horn comprises a helical or frusto-conical surface for engaging the fastener to apply a longitudinal signal during loosening or tightening of the fastener.

The fastener tool wherein the fastener tool comprises a rotational force generator that is integrated or separate from the acoustic/ultrasonic generator, the rotational force generator generates the rotational tortional signal and force to rotate the fastener as the acoustic/ultrasonic generator generates the ultrasonic or acoustic energy that passes into the fastener.

The fastener tool wherein the horn comprises a fastener-engaging surface for engaging the fastener, the fastener engaging surface being adapted to create an energy vortex within the fastener that facilitates loosening or fastening the fastener.

The fastener tool wherein the end comprises a head and/or nut that engages a mating surface at a head and/or nut engagement area where the head and/or nut engages the structure when the fastener is mounted thereto, the predetermined location being downstream/upstream of the head and/or nut engagement area so that when the ultrasonic or acoustic energy is applied to the fastener, a friction or pressure between the head and/or nut and its mating surface(s) along with the mating threads of the fastener and structure(s) is at least partly reduced.

The fastener tool wherein the fastener tool comprises an energy transfer facilitator for facilitating transferring the ultrasonic or acoustic energy into the fastener.

The fastener tool wherein the energy transfer facilitator comprises at least one of a fluid or material is arranged between the horn and at least one of the fastener or a socket, screwdriver bit, and/or torque bit mounted on the fastener, the fluid or material absorbing a minimal acoustic or ultrasonic energy as it travels into the fastener.

The fastener tool wherein the energy transfer facilitator may comprise but not limited to Teflon, oil, water, gel, foam, glycol, glycerin, and/or a polymer film or a minimal energy absorbing spacer.

The fastener tool wherein the fastener may comprise but not limited to an airplane, industrial, and/or automotive component fastener for fastening at least two components together.

The fastener tool wherein the fastener comprises a predetermined resonant frequency selected to match or generally correspond to a horn resonant frequency of the horn.

The system wherein the fastener comprises a head and/or nut that may have a shoulder (if present) that engages the structure at a shoulder engagement area of the structure, the predetermined distance being spaced under the head and/or nut and the shoulder engagement area.

The system wherein an end of the fastener comprises a head and/or nut that becomes situated at a head and/or nut engagement area of the structure when the fastener is mounted thereto, a predetermined location being along a length of the fastener and downstream/upstream of the head and/or nut engagement area so that when the acoustic/ultrasonic signal is applied to the fastener, a friction or pressure between the head and/or nut and its mating surface(s) along with the mating threads of the fastener and structure(s) is at least partly reduced.

The system wherein the fastener comprises male threads that mate with mating threads, the predetermined targeted location between the head and/or nut and its mating structure surface(s) along with the mating threads of the fastener and structure(s).

The system wherein the predetermined targeted location between the head and/or nut and its mating structure surface(s) along with the mating threads of the fastener and structure(s).

The system wherein the system comprises a rotational torque applicator adapted to apply a rotational torque to the fastener substantially simultaneously as the acoustic/ultrasonic signal passes through the fastener.

The system wherein a rotational torque applicator and the acoustic/ultrasonic wave generator are integrated into a common tool body, The system wherein the horn is sized and adapted to receive a head and/or nut end of the fastener.

The system wherein the horn is sized and adapted to receive a socket, screwdriver bit, and/or torque bit that is placed on a head and/or nut or end of the fastener to tighten or loosen the fastener, the socket, screwdriver bit, and/or torque bit receiving the acoustic/ultrasonic signal and causing it to pass into the fastener.

The system wherein the horn comprises a socket, screwdriver bit, and/or torque bit that is sized and adapted to receive a head and/or nut of the fastener.

The system wherein the predetermined distance being into the fastener and spaced under the bolt/screw head and/or nut such that the acoustic/ultrasonic signal is focused at a predetermined location in the fastener.

The system wherein the fastener has a head and/or nut, the horn being adapted and sized to receive or engage the head and/or nut to apply a tightening or loosening torque to the head and/or nut when the acoustic/ultrasonic signal passes therethrough.

The system wherein the horn comprises a socket, screwdriver bit, and/or torque bit that is sized and adapted to engage the head and/or nut and apply a rotational torque when the acoustic/ultrasonic signal passes into the fastener.

The system wherein the system comprises a plurality of horns that are sized and adapted for a plurality of fasteners that have a plurality of heads/nuts, respectively, of different shapes or sizes.

The system wherein the horn is configured or adapted to receive a plurality of sockets, screwdriver bits, and/or torque bits of different sizes so that the horn may be used to apply the acoustic/ultrasonic signal directly into and through the socket, screwdriver bit, and/or torque bit and into the fastener when the fastener is being tightened or loosened.

The system wherein the horn comprises a horn body; one or more replaceable tips removably coupled to the horn body.

The system wherein the system comprises a plurality of interchangeable or replaceable tips of different shapes or sizes to accommodate fasteners of different shapes or sizes, respectively, may include one or more replaceable tip being selected from the plurality of interchangeable or replaceable tips.

The system wherein the horn body comprises a plurality of replaceable tips to accommodate fasteners of different sizes.

The system wherein the horn body is threaded and the at least one replaceable tip comprises mating threads, a thread direction of the threads of the horn body being a direction opposite a thread direction of threads of the fastener.

The system wherein at least one of the plurality of interchangeable or replaceable tips comprises a generally optimized geometry and or flat fastener-engaging surface.

The system wherein at least one of the plurality of interchangeable or replaceable tips is adapted to cause the acoustic/ultrasonic signal to cause a vortex or helical energy to be applied internally to the fastener, the vortex or helical energy being in a predetermined direction.

The system wherein the predetermined direction is at least one of opposite a thread direction of threads on the fastener when loosening the fastener or the thread direction is the same as thread direction of threads when it is desired to tighten the fastener or of a larger diameter than the bolt/screw/nut that we are trying to remove/tighten.

The system wherein the horn comprises a helical surface.

The system wherein the horn comprises a helical surface that causes the acoustic/ultrasonic signal to vortex in a predetermined direction for either loosening or tightening the fastener.

The system wherein the vortex is counterclockwise for a right-hand threaded fastener or clockwise for a left-hand threaded fastener to facilitate rotating the fastener when the acoustic/ultrasonic signal passes therein to loosen it.

The system wherein the vortex is clockwise for a right-hand threaded fastener or counterclockwise for a left-hand threaded fastener to facilitate rotating the fastener when the acoustic/ultrasonic signal passes therein to tighten it.

The system wherein the fastener comprises an end that is engaged by the horn during loosening or fastening, the acoustic/ultrasonic generator generating the acoustic/ultrasonic signal that travels into the fastener the predetermined distance and becomes concentrated or focused at a predetermined location in the fastener.

The system wherein the end comprises a head and/or nut that engages a mating surface of the structure at a head and/or nut engagement area where the head and/or nut engages the structure when the fastener is mounted thereto, the predetermined location being downstream/upstream of the head and/or nut engagement area so that when the acoustic/ultrasonic signal is applied to the fastener, a friction or pressure between the head and/or nut and its mating surface(s) along with the mating threads of the fastener and structure(s) is at least partly reduced.

The system wherein the horn is configured or adapted to receive a plurality of sockets, screwdriver bits, and/or torque bits of different sizes so that the horn may be used to apply the acoustic/ultrasonic signal directly into and through the socket, screwdriver bit, and/or torque bit and into the fastener when the fastener is being tightened or loosened.

The system wherein the acoustic/ultrasonic generator applies the acoustic/ultrasonic signal at a frequency equal to or larger than 1 kHz.

The system wherein the fastener has a head and/or nut, the horn being adapted and sized to receive the head and/or nut to apply a tightening or fastening torque to the head and/or nut while the acoustic/ultrasonic signal passes therethrough.

The system wherein the tool comprises a plurality of horns that are sized and adapted for a plurality of fasteners that have a plurality of heads, respectively, of different shapes or sizes.

The system wherein the horn comprises a helical or frusto-conical surface for engaging the fastener to apply a rotational torsional signal or force during longitudinal vibration of the fastener so that both a longitudinal signal and a tortional signal and force are applied substantially simultaneously or alternating to the fastener during loosening or tightening of the fastener.

The system wherein the acoustic/ultrasonic generator generates and applies the acoustic/ultrasonic signal, the tool comprising a rotational force generator that may be integrated or is separate from the acoustic/ultrasonic generator, the rotational force generator generates a tortional signal or force to rotate the fastener as the acoustic/ultrasonic generator generates the acoustic/ultrasonic signal passes into the fastener at the predetermined distance.

The system wherein the horn comprises a fastener-engaging surface for engaging the fastener, the fastener engaging surface being adapted to create an energy vortex within the fastener that facilitates loosening or tightening the fastener.

The system wherein the fastener comprises a head and/or nut that engages a mating surface at a head and/or nut engagement area of the structure when the fastener is mounted thereto, the predetermined location targeted location being between the head and/or nut and its mating structure surface(s) along with the mating threads of the fastener and structure(s).

The system wherein the end comprises a head and/or nut that engages a surface at a head and/or nut engagement area where the head and/or nut engages a structure when the fastener is mounted thereto, the predetermined location being downstream/upstream of the head and/or nut engagement area so that when the acoustic/ultrasonic signal is applied to the fastener, a friction or pressure between the head and/or nut and its mating surface(s) along with the mating threads of the fastener and structure(s) is at least partly reduced.

The system wherein the system comprises an energy transfer facilitator for facilitating transferring the acoustic/ultrasonic signal into the fastener.

The system wherein the energy transfer facilitator comprises at least one of a fluid or material and is arranged between the horn and at least one of the fastener or a socket, screwdriver bit, and/or torque bit mounted on the fastener, the fluid or material absorbing minimal acoustic/ultrasonic signal while traveling into the fastener.

The system wherein the energy transfer facilitator may comprise, but not limited to Teflon, oil, water, gel, foam, glycol, glycerin, and/or a polymer film or a minimal energy absorbing spacer.

The system wherein the fastener may comprise but not limited to an airplane, industrial, and/or automotive component fastener for fastening at least two components together.

The system wherein the horn comprises a predetermined resonant frequency selected to match or generally correspond to a fastener resonant frequency.

The system wherein the acoustic or ultrasonic energy is applied via a liquid or gel transfer agent from the horn and/or generator through a transfer tube like component directly to the bolt/screw head and/or nut. This is especially useful in difficult to reach and minimal clearance applications where a direct horn application is not feasible.

The system wherein the acoustic or ultrasonic energy creates a gap under the bolt/screw head and or nut and the mating structure surface, which in turn partly reduces the pressure or torque required to remove the fastener.

The system wherein the bolt/screw head design is optimized to receive acoustic or ultrasonic energies.

These and other objects and advantages of the invention will be apparent from the following description, the accompanying drawings and the appended claims.

BRIEF DESCRIPTION OF THE ACCOMPANYING DRAWINGS

Figure 13:
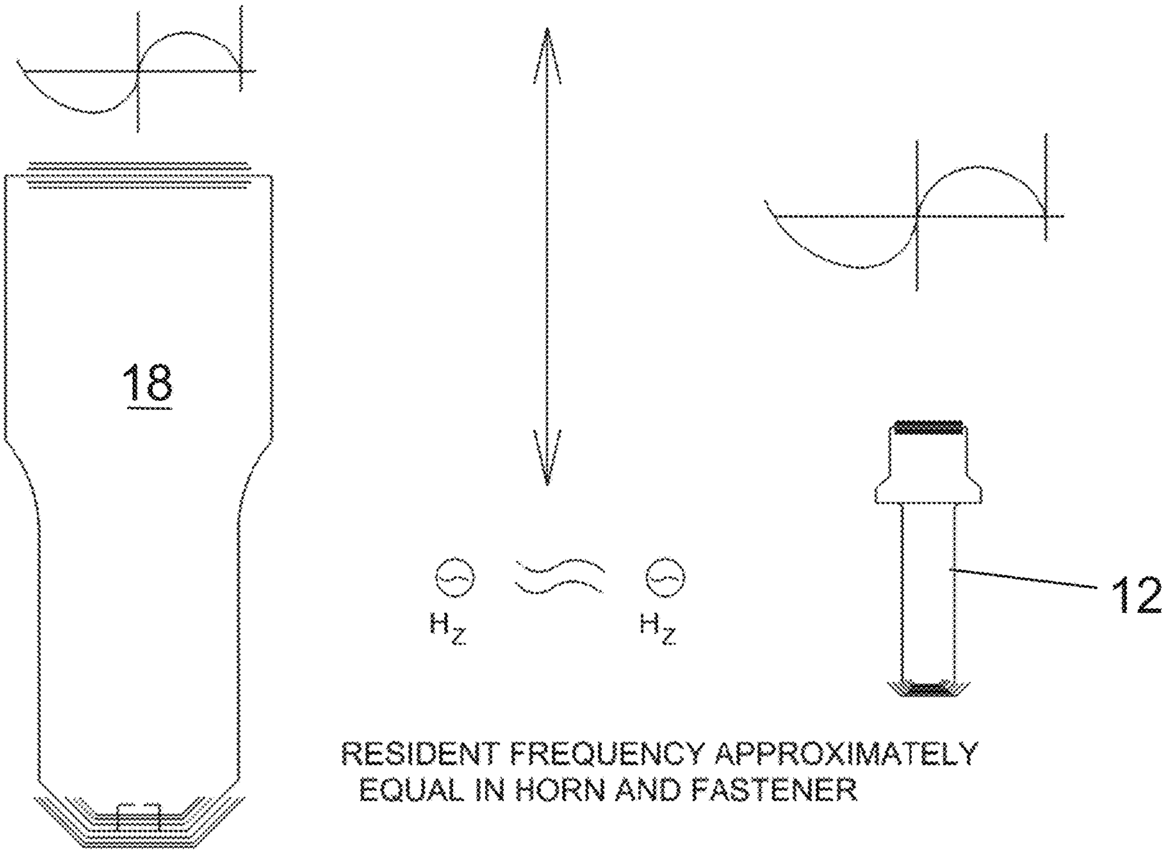
Figure 14:
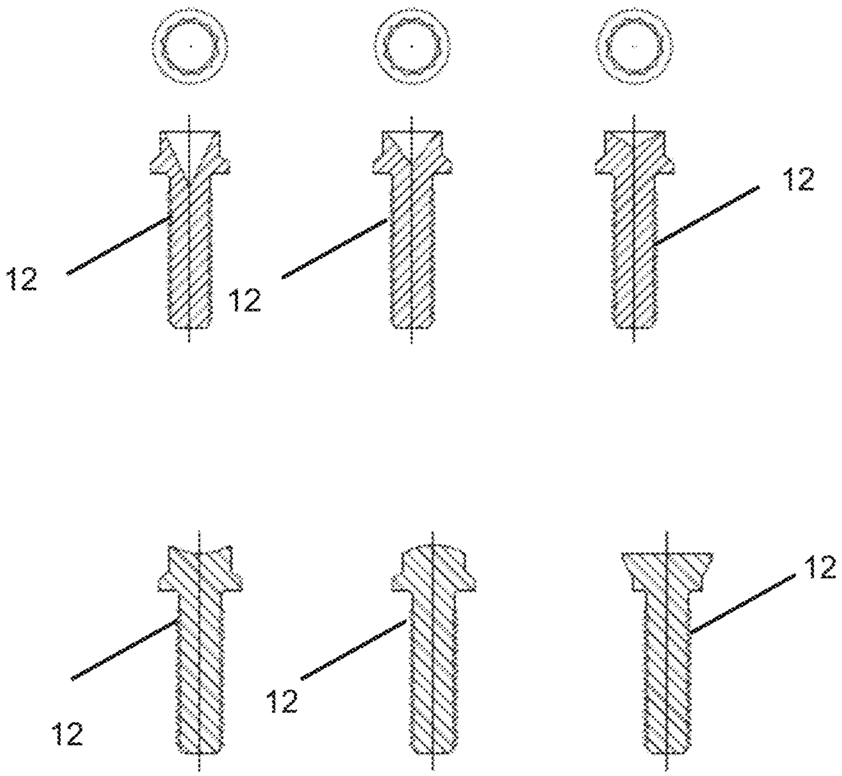

FIG. 13 resonant frequency of the horn corresponding to the resonant frequency of the fastener; and FIG. 14 is a view of various representative bolt head designs used to facilitate energy transfer.

DETAILED DESCRIPTION OF THE PREFERRED EMBODIMENTS

Referring now to FIGS. 1-14 a tool or system 10 and method for loosening or tightening a fastener 12 will now be described. The system 10 (FIG. 1) comprises an acoustic/ultrasonic wave generator 14 for generating an ultrasonic or acoustic energy or signal that passes longitudinally through the fastener 12 to elongate and shorten the fastener 12 and to introduce a cyclic strain and heating within the fastener 12 to reduce a frictional force between the fastener 12 and structures 22 and 24. In this regard, details of the cyclic or acoustic/ultrasonic strain, heating and elongation of the fastener 12 will be described in more detail later herein.

The system 10 comprises the acoustic/ultrasonic generator 14 which, in a preferred embodiment, applies an ultrasonic or acoustic energy at a frequency equal to or larger than 1 KHz. The acoustic/ultrasonic generator 14 is coupled to a fastener tool 16 that comprises an armature 16*a*, which is coupled to a horn 18 as shown. Note that the horn 18 comprises a socket, screwdriver bit, and/or torque bit tip 20 for receiving a head and/or nut 12*a* of the fastener 12. The horn 18 comprises a threaded aperture 18*a*1 that threadably receives a threaded projection 20*a* of the socket, screwdriver bit, and/or torque bit tip 20. In other embodiments described later relative to FIG. 9, the socket, screwdriver bit, and/or torque bit tip 20 is integrally formed in an end 18*a* of the horn 18. In other embodiments illustrated in FIGS. 1 and 9, the horn 18 may have an interchangeable or replaceable socket, screwdriver bit, and/or torque bit tip 20 which will be described later herein relative to FIG. 9.

Figure 8:
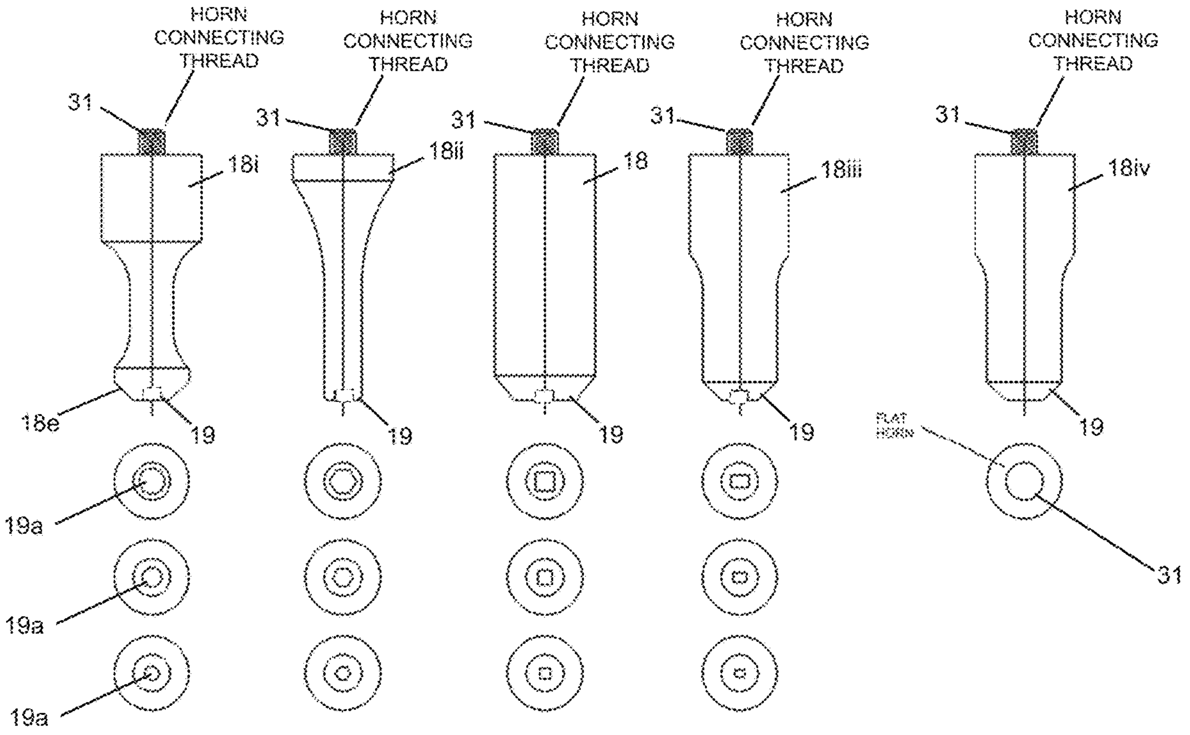
FIG. 8 is a view of a plurality of horns having a plurality of differently shaped sockets, screwdriver bits, and/or torque bits for receiving different shaped fasteners, as well as a horn having a generally optimized geometry and or flat end.

In the illustration being described relative to FIG. 8, the horn 18 comprises the end 19 which is adapted to define the socket, screwdriver bit, and/or torque bit opening 19 and is sized and adapted to complement the size and shape of the head and/or nut 12*a* of the fastener 12. The horn 18 may engage the fastener 12 and apply a cyclic or acoustic/ultrasonic energy thereto when the acoustic/ultrasonic generator 14 is energized. Thus, it should be understood that the horn 18 may be a uniform, monolithic construction with the end 19 having the socket, screwdriver bit, and/or torque bit opening 19 adapted and sized to mate with and receive the fastener head and/or nut 12*a*. This is illustrated in FIG. 8.

Figure 9:
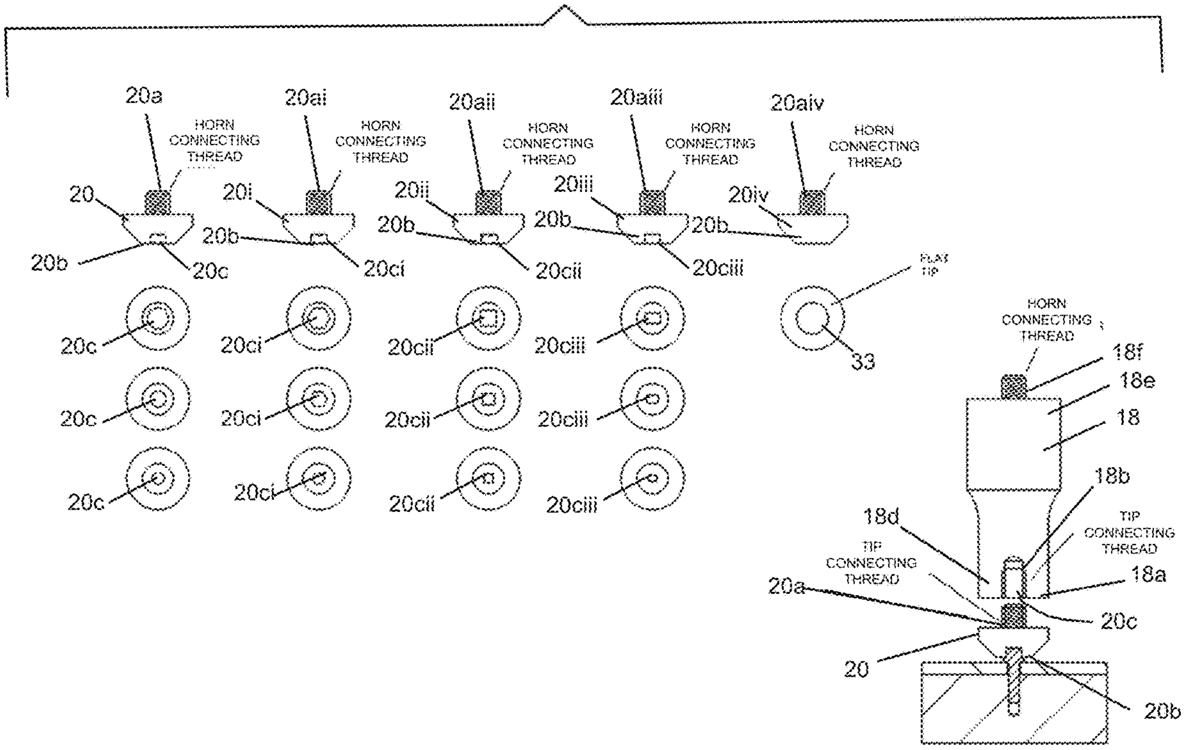
FIG. 9 is an illustration of a plurality of replaceable and interchangeable tips that are threadably mounted onto an end of a horn, with each of the tips having either a socket, screwdriver bit, and/or torque bit adapted to receive and mate with a fastener head and/or nut or a flat tip.

Alternatively in FIG. 9, the horn 18 may accept a generally optimized geometry and or flat and opposing tool-engaging surfaces that is adapted and sized to threadably receive at least one socket, screwdriver bit, and/or torque bit tip 20 that comprises the threaded projection 20*a* and on an opposite end 20*b* the aperture 20*c* that is adapted and sized to mate with the head and/or nut 12*a* of the fastener 12. In this regard, a user selects at least one socket, screwdriver bit, and/or torque bit tip 20 that is complimentary and sized to mate with the head and/or nut 12*a* of the fastener 12 to be worked on so that the tool can apply the cyclic and acoustic/ultrasonic energy described herein, as well as a rotational torque in some embodiments that will also be described later herein. Note that each of the sockets, screwdriver bits, and/or torque bit tips 20 can have the same or a different configuration or shape so that they can each accommodate and receive the head and/or nut 12*a* of the fastener 12 having a complimentary shape. FIG. 9 shows a plurality of sockets, screwdriver bits, and/or torque bit tips 20 that can be selectively and threadably mounted in the end 20*c* of the horn 18. Alternatively, and as mentioned herein relative to FIG. 8, the horn 18 may be a monolithic one piece construction that has the socket, screwdriver bit, and/or torque bit opening 19 that is adapted to receive the head and/or nut 12*a* of the fastener 12.

Figure 1:
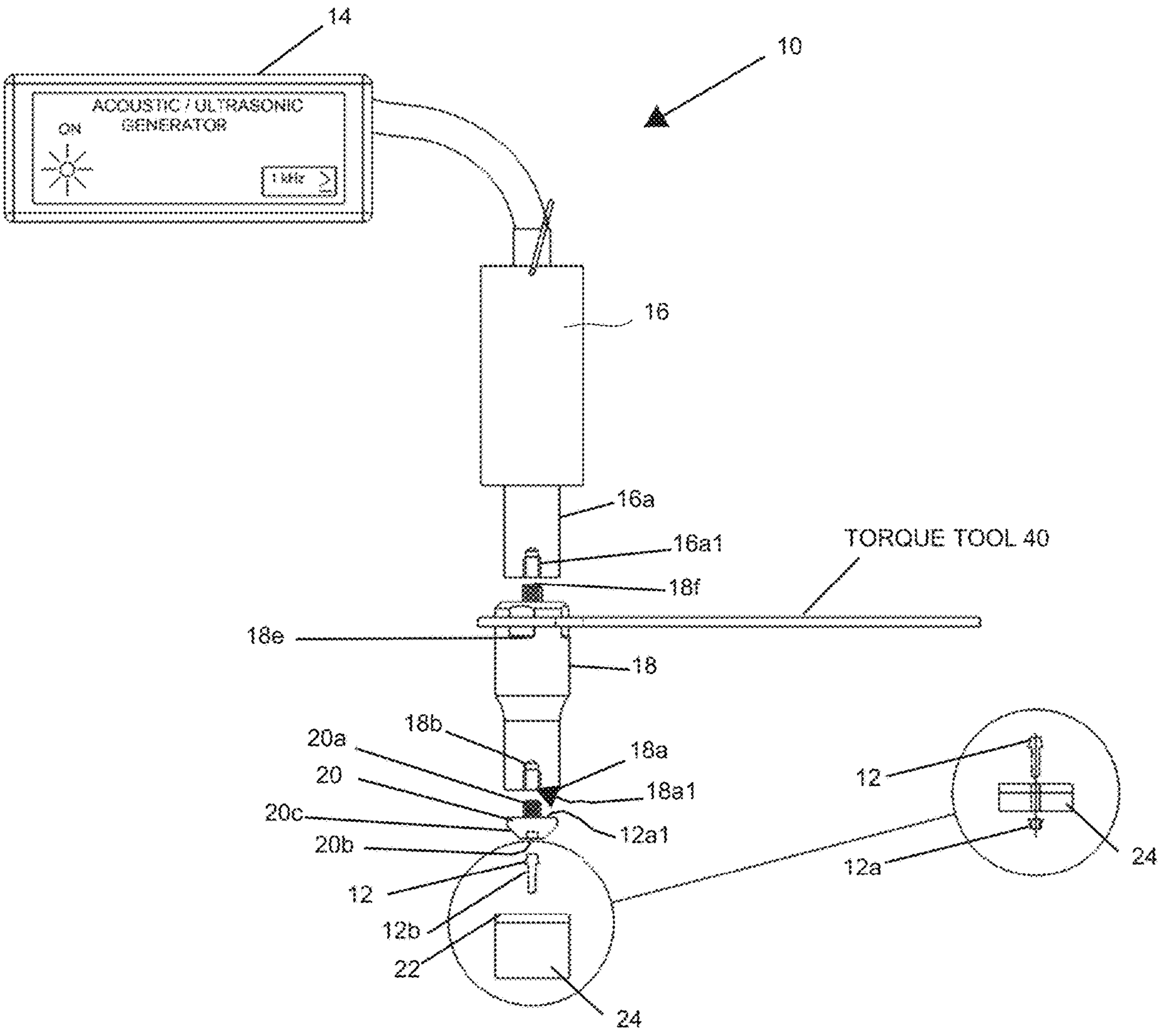
FIG. 1 is a view of the system and fastening tool having a replaceable tip.

In one embodiment, a plurality of sockets, screwdriver bits, and/or torque bit tips 20 are provided in a set for selection by a user and the appropriate socket, screwdriver bit, and/or torque bit tips 20 for a particular fastener 12 is identified and selected and then threadably mounted in the threaded aperture 20*c* on the end 18*a* of the horn 18, as illustrated in FIGS. 1 and 9. FIG. 1 shows an exploded view of the various parts. In this illustration, the fastener 12 is used to secure a first part or structure 22 to the second part or structure 24. It should be understood that one primary feature or function of the system 10 is to unscrew or loosen the fastener 12 that is locked or frozen (i.e., won't loosen/remove without damage) to the structures 22 and 24. It is not uncommon, for example, in the airplane engine industry along with other industries, that the fasteners 12 and structures 22 and 24 are subjected to various environmental conditions, material mismatches, and temperatures during normal operation that can cause the fastener 12 to be seized/locked or difficult to "break" from the structures 22 and 24. When this happens, the fastener 12 cannot be unfastened without either stripping the head and/or nut 12*a* of the fastener 12 or causing the head and/or nut 12*a* to break off when a rotational torque is applied to the head and/or nut 12*a*. The inventors have found that by the selective and focused application of the cyclic and acoustic/ultrasonic energy as described herein by the acoustic/ultrasonic wave generator 14, armature or fastener tool 16 and horn 18, reductions in the "breaking/break away force" have been realized as will be described in more detail later herein relative to FIG. 7.

In this regard, the acoustic/ultrasonic wave generator 14 and the horn 18 or the socket, screwdriver bit, and/or torque bit tips 20 for the embodiments of FIGS. 1 and 9 cooperate to focus or apply the acoustic/ultrasonic signal to focus the ultrasonic or acoustic energy at a predetermined focus area 25 (FIG. 3), which is a predetermined distance PD (FIG. 3) into the fastener 12. This, in turn, reduces a coefficient of friction between the threads 12*b* (FIG. 3) of the fastener 12 and the threads 24*b* of the structure 24 when the horn 18 is in operative relationship with the fastener 12 and the acoustic/ultrasonic signal from the acoustic/ultrasonic generator 14 is applied thereto.

Figures 3, 3A, 3B:
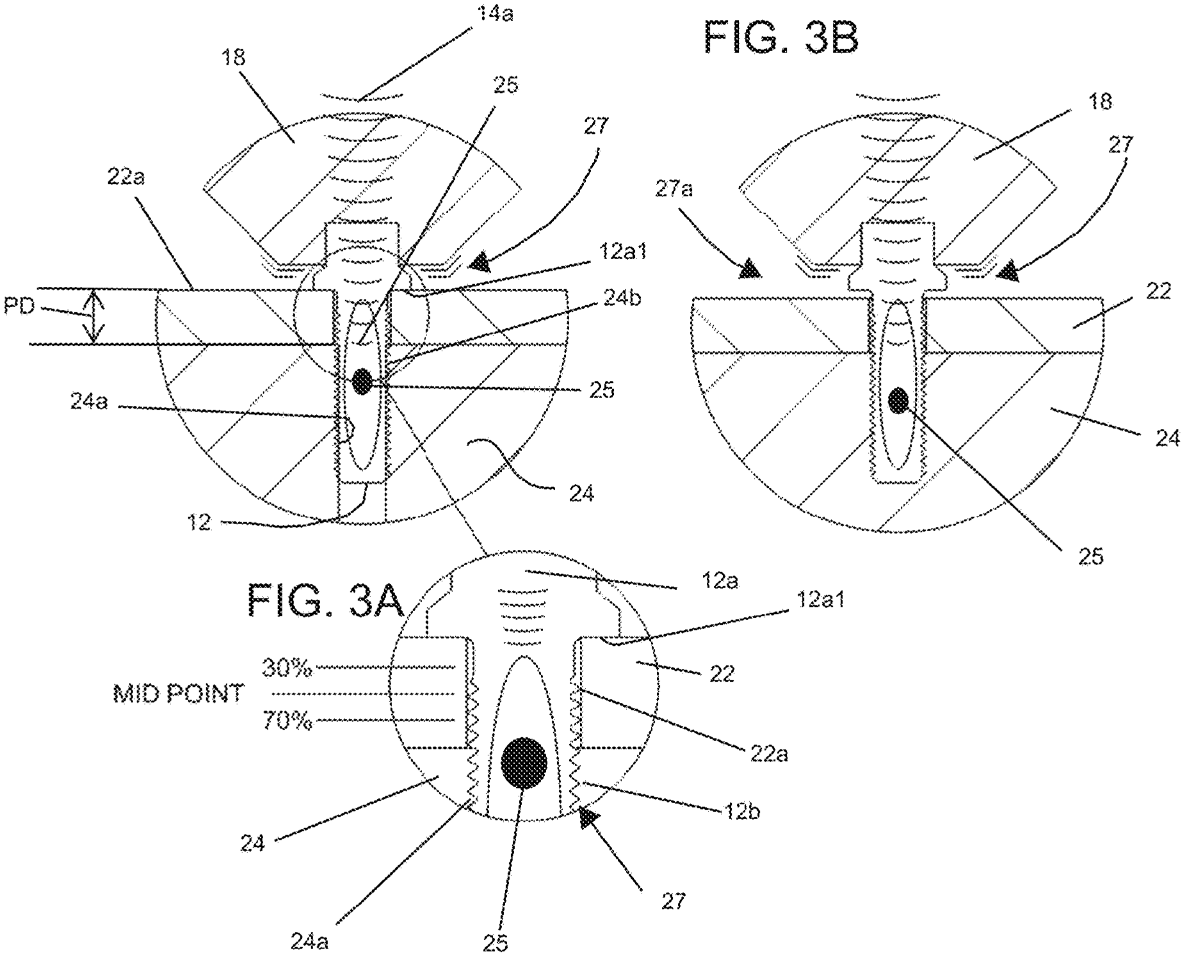
FIGS. 3, 3A and 3B are views illustrating a focus of the ultrasonic or acoustic energy passing into the fastener.
Figure 4:
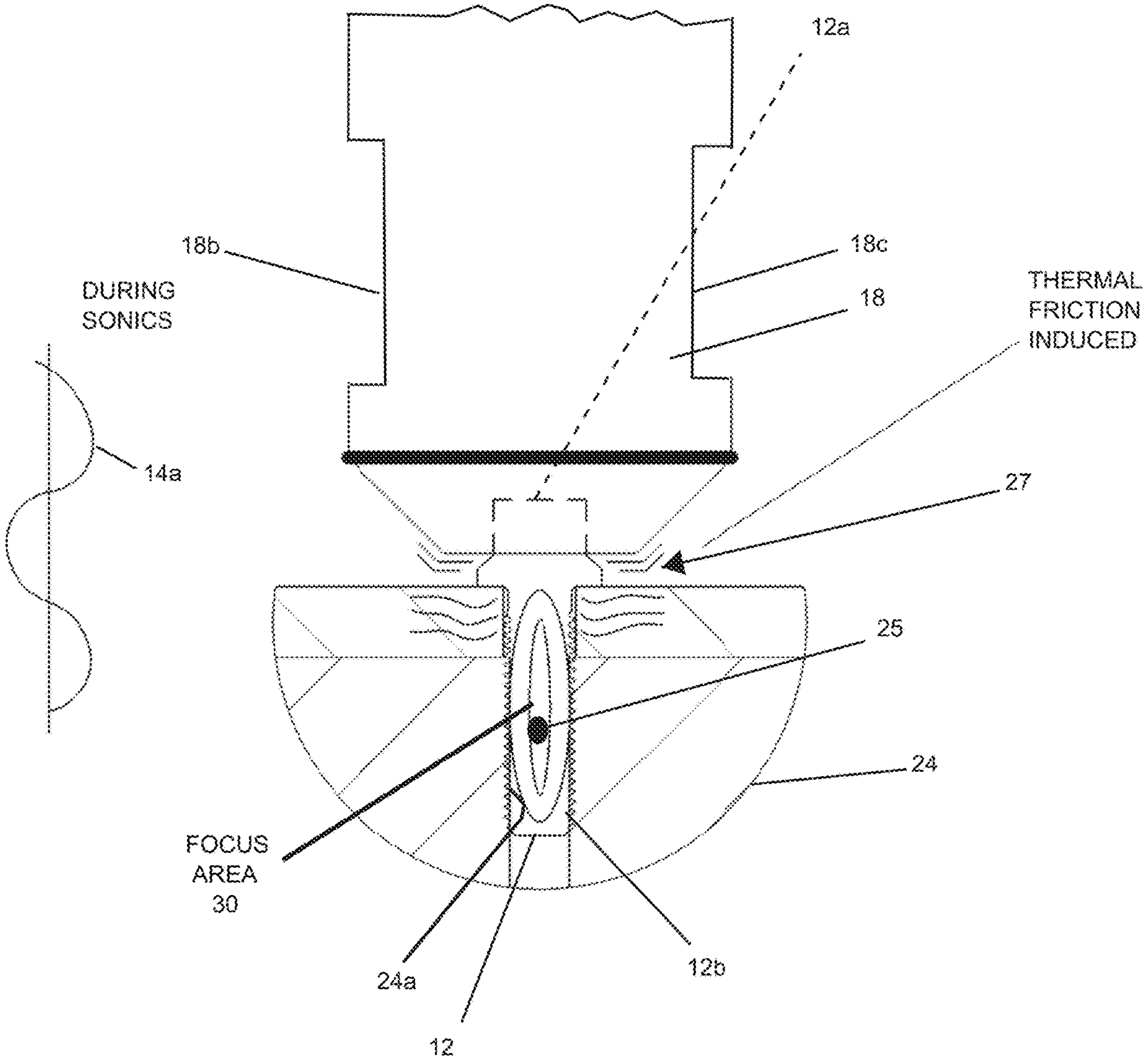
FIG. 4 is another view illustrating the focus area and a predetermined focus point, along with an energizing curve.

Referring now to FIGS. 3, 3A and 4, the acoustic/ultrasonic signal and the predetermined distance PD will now be described. Note that the fastener 12 secures the structure 22 to the structure 24. The structure 22 has the surface 22*a* that is sized and adapted to allow the fastener 12 to be inserted therethrough. The structure 24 comprises the threaded opening 24*a* that is adapted and sized to mate with and receive the threads 12*b* of the fastener 12. The acoustic/ultrasonic waveform 14*a* is illustrated in FIGS. 3, 3A and 3B and is generated by the acoustic/ultrasonic generator 14 and transmitted longitudinally (as viewed in FIGS. 3 and 3B) down the longitudinal length of the fastener 12. In one embodiment, the predetermined distance PD is a distance that is below the bolt/screw head and/or nut 12*a*1 of the head and/or nut 12*a* of the fastener 12 where it engages a surface 22*a* and the predetermined focus area or point 25 of concentrated energy applied by the acoustic/ultrasonic generator 14. Note that the predetermined focus area 25 is concentrated energy that is generally situated along a longitudinal length or axis of the fastener 12 and can be throughout the threaded surface 24*a* of the structure 24.

FIGS. 3-3B and 5A-5D illustrate the cyclic and acoustic/ultrasonic energy being applied to the fastener 12. This energy, in turn, causes a cyclic strain between the threads 12*b* (FIG. 5D) of the fastener 12 and the threads 24*a* of the structure 24. Notice that the head and/or nut 12*a* of the fastener 12 and the shoulder (if present) 12*a*1 become situated at a head and/or nut engagement area 27 (FIG. 5C) of the structure 22 or surface 22*a* when the fastener 12 is secured or screwed into the structure 24. It should be understood that the predetermined distance PD between the shoulder (if present) 12*a*1 and the predetermined focus area 25 is such that the predetermined focus area 25 is generally along a longitudinal length of the fastener threads 12 and downstream/upstream of the head and/or nut engagement area 27 so that when the ultrasonic or acoustic energy is applied to the fastener 12, a friction or pressure between the bolt and/or nut 12*a*1 and a mating surface 22*a* of the structure 22 (FIG. 5C) along with the frictional reduction between the fastener threads 12*b*1 and the structure thread 24*b*1 is at least partially reduced which in turn facilitates loosening the fastener 12, especially if a rotational torque is applied thereto. The inventors have found that the rotational torque necessary to loosen the fastener 12 is reduced compared to the torque that is necessary to loosen the fastener 12 when no acoustic/ultrasonic energy is applied. This will be described in more detail relative to FIG. 7.

Furthermore, during acoustic/ultrasonic energy application the bolt/screw head/nut elongates and a gap 27*a* becomes present between the bottom of the bolt/screw head 12*a*1 and the top of the surface of 22*a*. This gap 27*a* is illustrated in FIG. 3B. The lifting up the bolt/screw or nut head from the surface of 22 or 24 reduces the surface friction and ultimately the rotational torque require to loosen the fastener.

Figures 5A, 5B, 5C, 5D:
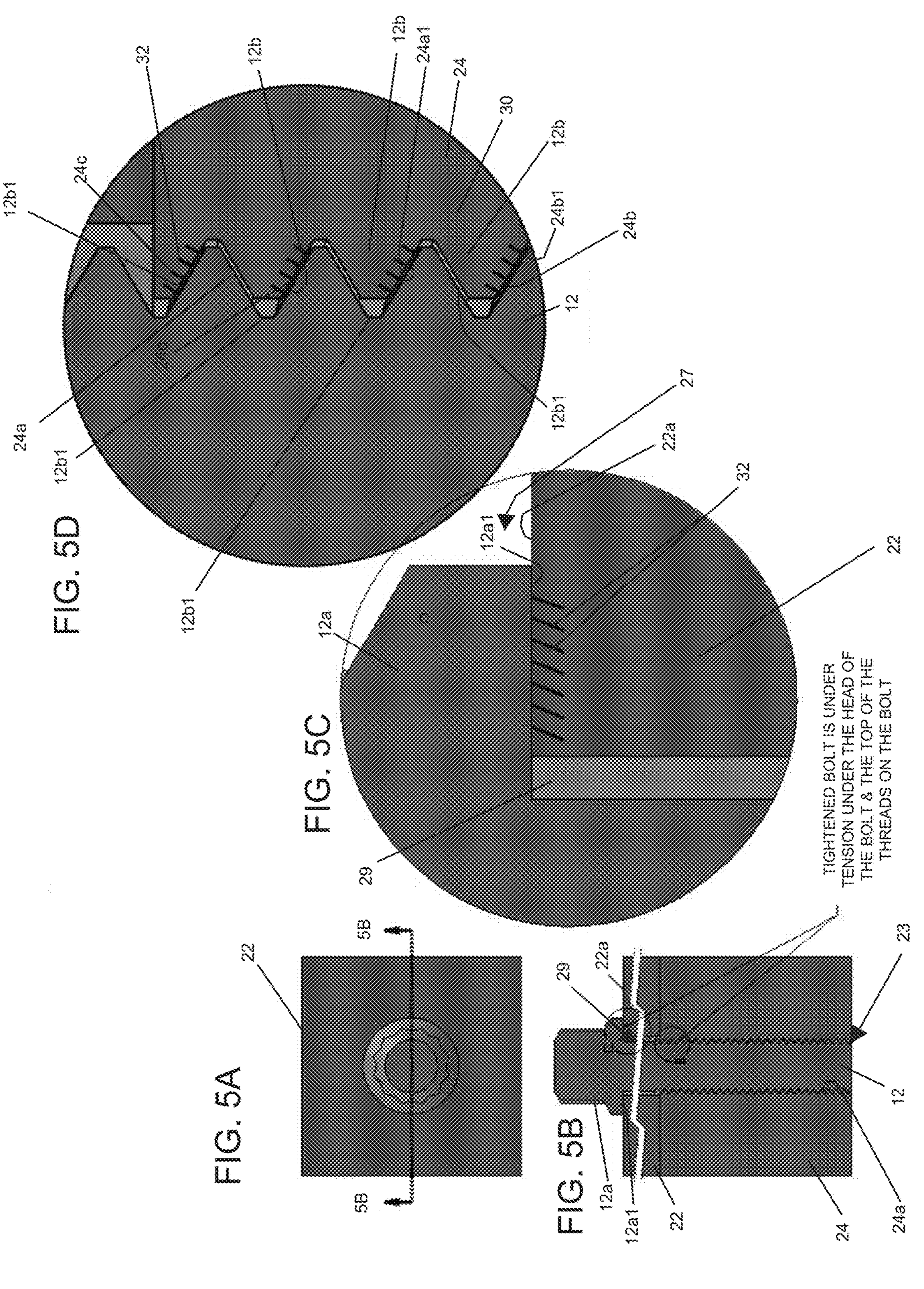
FIGS. 5A-5D are illustrations showing the cyclic stress and heating that results from applying the ultrasonic or acoustic energy into the fastener.

FIGS. 5A-5D illustrate these features in greater detail. FIGS. 5A-5D illustrate these features in greater detail. For ease of understanding, FIG. 5B shows a simplified fragmented and sectional view showing that the structure 24 has an aperture 23 and internal threads 24*a*. In FIG. 5B, note that the fastener 12 secures the structure 22, which has the unthreaded aperture 29 (FIGS. 5B and 5C), so that the fastener 12 can pass therethrough. As illustrated in FIG. 5B, the fastener 12 secures the structure 22 to the structure 24. Note that as the fastener 12 is tightened, it places the head and/or nut 12*a* and shoulder (if present) 12*a*1 of the fastener 12 under tension (illustrated in FIG. 5C) against the top surface 22*a*. This is illustrated in FIG. 5C where the shoulder (if present) 12*a*1 cooperates with the top surface 22*a* which results in a tension between the surfaces 22*a* and bottom of the bolt/screw head 12*a*1. The tension introduces heat in the fastener 12 and is represented by tension or strain lines or curves 32 in the FIG. 5C.

FIG. 5D illustrates the resulting tension between the threads 12*b* of the fastener 12 and the threads 24*b* of the structure 24. Note the tension and strain at the upper surfaces

**12*b*1 of the threads 12*b* of the fastener 12 and the bottom surfaces 24*b*1 of the structure threads 24*b***.

Referring back to FIG. 4, notice that a focus area 25 is where the ultrasonic or acoustic energy is focused in the fastener 12. FIG. 3B illustrates the acoustic/ultrasonic waveform **14*a* that is applied to the horn 18 and which causes the acoustic/ultrasonic and cyclic elongation, shortening and strain between the fastener 12 and the structures 22 and 24. The energizing waveform 14*a* (FIG. 4) causes the acoustic/ultrasonic action, and a thermal friction is induced as illustrated by the tension or strain lines or curves 32 in FIGS. 5C and 5D. As mentioned, the acoustic/ultrasonic energy causes the fastener 12 to elongate and shorten in response to the sinusoidal input energy or waveform 14*a* which also causes a strain between the upper surfaces 12*b*1 of the threads 12*b* and the mating lower surfaces 24*b*1 of the threads 24*b*. Again, the tension or strain lines or curves 32 is represented by the tension or strain lines or curves 32 in FIGS. 5C and 5D. It should be understood that the tension or strain lines or curves 32 cause a cyclic heating of the threads 12*b* and threads 24*b* which causes an external expansion and contraction of the fastener 12 along its longitudinal length which in turn induces more heating. The application of the acoustic/ultrasonic energy in response to the sinusoidal waveform 14*a* (FIG. 4), along with the thermal friction inducement between the head and/or nut 12*a* of the fastener 12 and the structures 22 and 24, all cooperate to reduce or facilitate reducing the amount of torque necessary to unloosen or tighten the fastener 12 from or to, respectively, the structures 22 and 24**.

Figure 6:
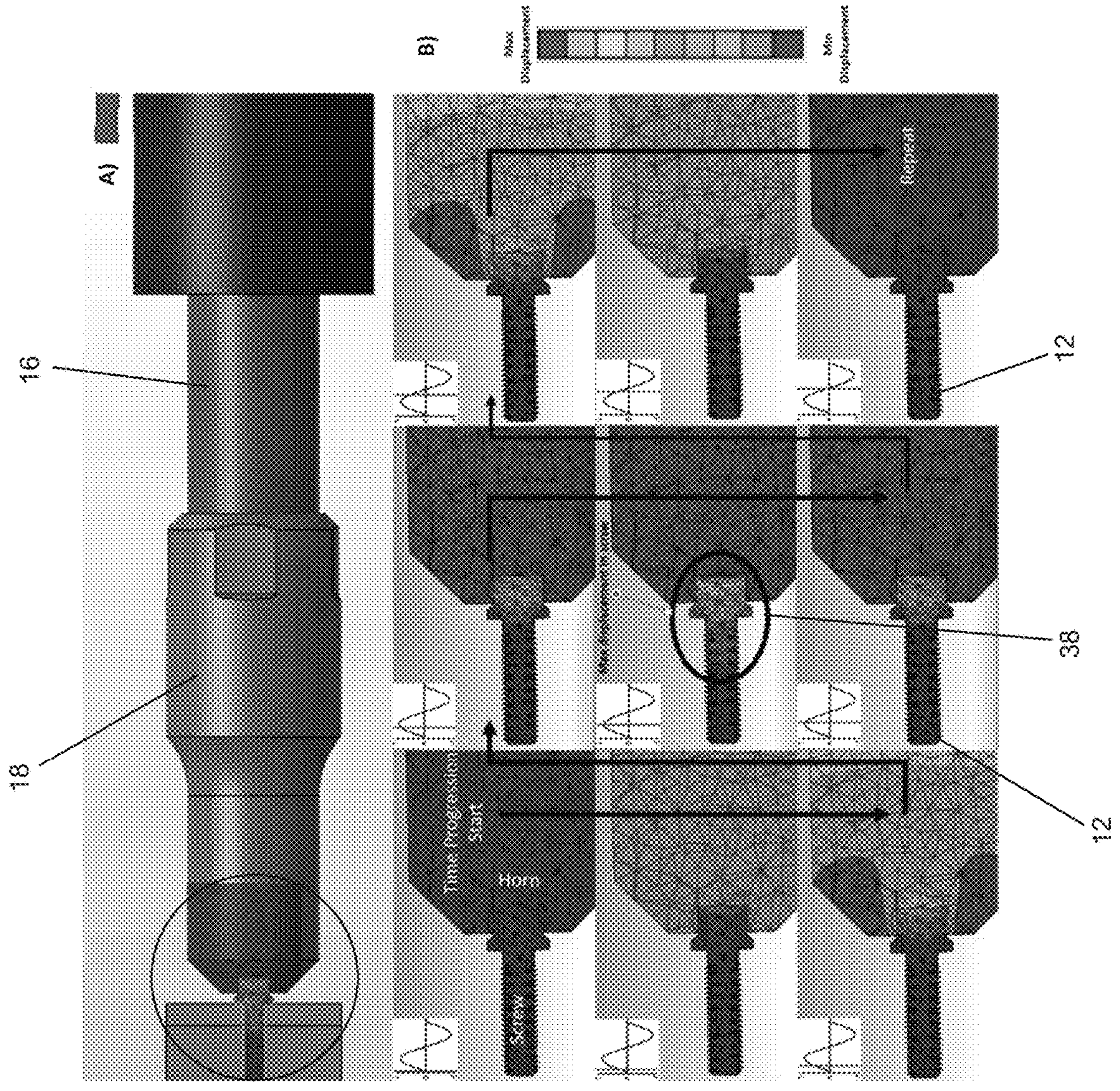
FIG. 6 is a progressive view illustrating the ultrasonic or acoustic energy traveling into the fastener.

FIG. 6 is a graphic example stress diagram of various stress levels that occur during the application of the acoustic/ultrasonic energy. Notice in the illustration that the stress and application of energy is zero in the bottom left-hand portion of the FIG. 6 and progresses along the progression arrows as illustrated. The sinusoidal waveforms associated with each view illustrate timing diagrams of the application of the energy. Note that as the acoustic/ultrasonic energy is applied, stress increases first from the top of the fastener 12 until the acoustic/ultrasonic energy is applied into the fastener 12 along its length in the area 38 as described earlier herein. Again, the acoustic/ultrasonic energy causes an expansion and contraction in response to the acoustic/ultrasonic waveform **14*a* which in turn causes the thermal friction to be induced during the application of the acoustic/ultrasonic energy. Preferably, when the acoustic/ultrasonic energy is in the area 38 and along the length of the fastener 12, a rotational torque may be substantially simultaneously applied to the horn 18 in order to rotate the fastener 12 and loosen it from the structures 22 and 24. Ultimately, as the acoustic/ultrasonic generator 14 reduces the application of the acoustic/ultrasonic energy applied to the horn 18 which causes the acoustic/ultrasonic energy to recede from the fastener 12 as illustrated. Note that a maximum heating or displacement, linear motion, longitudinal motion occurs in the central view. Notice that the color red indicates heat generation and blue is relatively cool or cold. The system 10 is energized for as long as it takes to free the fastener 12**.

Figure 7:
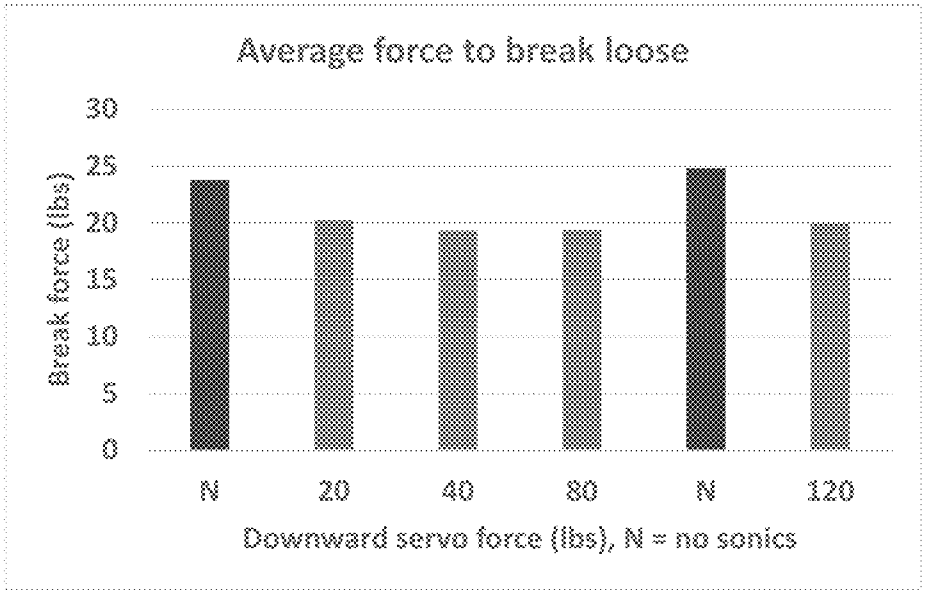
FIG. 7 is a bar diagram illustrating a reduction in the breakaway force required as a result of applying the system to a fastener.

FIG. 7 is an example bar graph showing an average force to break or loosen the fastener 12 from the structure 24 in the illustration being described. These numbers are illustrative only and will change depending on the size of the fastener 12, size of the structures 22 and 24, break force between the fastener 12 and the structures 22 and 24 and the like. The columns identified with the letter "N" illustrate examples of a similar size fastener 12, but where no acoustic/ultrasonic energy is applied through the horn 18 to the head and/or nut **12*a* of the fastener 12. The other columns illustrate several examples of the break force when sonics were applied. Note that in all examples where the system 10 was used, the break force was reduced by about 5 pounds force as a result of the acoustic/ultrasonic generator 14 applying acoustic/ultrasonic energy to the horn 18 and into the fastener 12**. Notice that the break force without the acoustic/ultrasonic energy was roughly 5 pounds force greater.

Referring back to FIG. 3B, it should be understood that the acoustic/ultrasonic generator 14 applies the energizing waveform **14*a* (FIG. 4) to the fastener tool 16 which in turn imparts the acoustic/ultrasonic energy directly to the horn 18. When the horn 18 is mounted on the head and/or nut 12*a* of the fastener 12, that energy is transmitted directly into the fastener 12 along its longitudinal length. As was also mentioned earlier herein, this creates tension and thermal friction is induced between the threads 12*b* of the fastener 12 and the threads 24*b* of the structure 24. Note that the predetermined location of the predetermined focus area 25 is in the fastener 12 and spaced from the head and/or nut engagement area 27 as illustrated in FIGS. 3, 3A and 3B. The predetermined focus area 25 with focused energy is along the length of the fastener 12 and under the head and/or nut engagement area 27 so that when ultrasonic or acoustic energy is applied to the fastener 12, the friction pressure or break force between the head and/or nut 12*a* and the mating surface 24*a* is at least partly reduced. As mentioned earlier, this also causes a reduction in the stress between the shoulder (if present) 12*a*1 of the head and/or nut 12*a* and the surface 22*a* of the structure 22. Moreover, it also causes a reduction in the friction or pressure between the upper surfaces 12*b*1 and the thread surfaces 12*a*1 as a result of the application of the ultrasonic or acoustic energy in response to the input waveform 14*a***.

As mentioned earlier herein, during the application of the ultrasonic or acoustic energy by the acoustic/ultrasonic generator 14, it is preferable to apply a rotational torque to the fastener 12. Accordingly, the system 10 has multiple means and apparatus for generating or performing such rotational torque which will now be described.

Figure 2A:
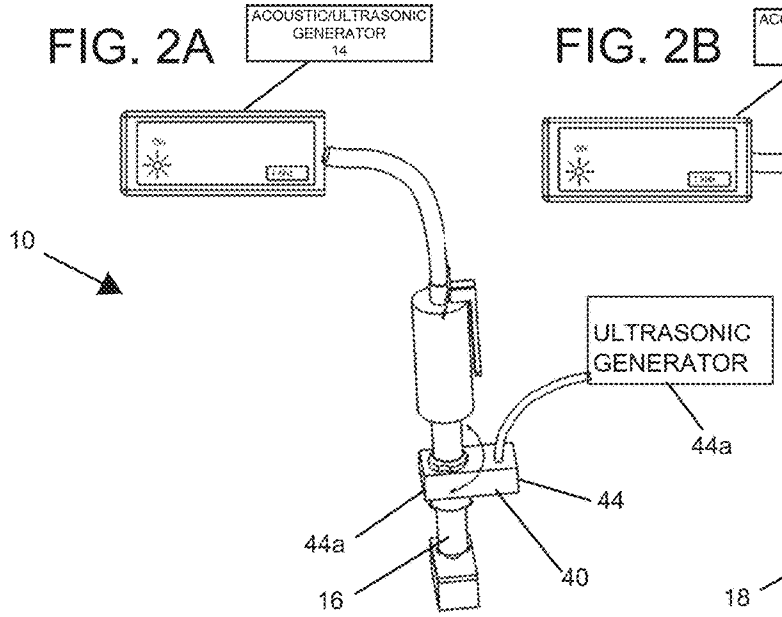
FIGS. 2A-2B are views of a system and fastening tool and also a rotational torque applicator example.
Figure 2B:
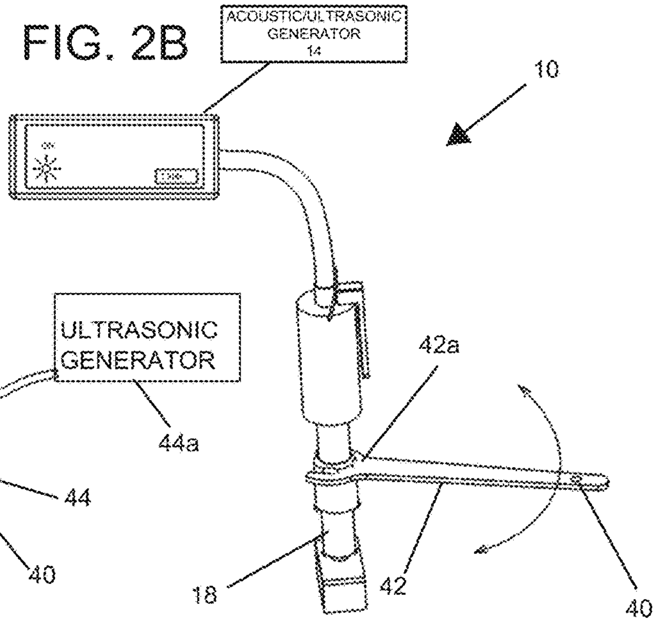

Referring now to FIGS. 2A and 2B, it should be understood that the system 10 may comprise a rotational torque applicator 40 for applying a rotational torque to the fastener 12 substantially simultaneously as the ultrasonic or acoustic energy passes into the fastener 12. The rotational torque applicator 40 may comprise at least one of a mechanical torque applicator in the form of a wrench 42 (FIG. 2B) or tool sized and adapted to engage the generally optimized geometry and or flat and opposing tool-engaging surfaces **18*b* and 18*c* (FIG. 4) in order to permit manual rotational torque application. Alternatively, an acoustic/ultrasonic torque applicator 44 that is coupled to an acoustic/ultrasonic generator 44*a* which generates an acoustic or ultrasonic signal which energizes the wrench 42 to rotationally drive the horn 18 which in turn rotatably drives the fastener 12. The torque applicator may also just provide just a rotational motion without acoustic/ultrasonics as illustrated in item 40 and 44. In this regard, note that the horn 18 may have a plurality of generally optimized geometry and or flat areas and opposing tool-engaging surfaces 18*b* and 18*c* (FIGS. 1 and 3B) that are sized and adapted to receive the working end 42*a* of the wrench 42. Likewise, the tool 40 also has a mating tool end (not shown) that is adapted and sized to engage the generally optimized geometry and or flat and opposing tool-engaging surfaces 18*b* and 18*c* in order to rotatably drive the horn 18**. Other means for rotatably driving the tool may also be applied, such as pneumatic, electric or other automatic tool.

In one illustrative embodiment, the acoustic/ultrasonic generator 14 and the rotational torque applicator 40 may be either the Dukane IQ 600 W handheld or a Dukane IQ 2400 W Servo, both of which are available from Dukane Corp. located at 2900 Dukane Drive St. in Charles, Illinois 60174.

It is important to understand that the rotational torque applicator 40 preferably applies the rotational torque to the horn 18 substantially simultaneously as the ultrasonic or acoustic energy from the acoustic/ultrasonic generator 14 passes into the fastener 12. The inventors have found that by causing the acoustic or ultrasonic energy to pass to the predetermined focus area 25 causes the elongation of the fastener 12 in the cyclic heating and stress between the threads 24*a* and the threads 12*b* of the fastener 12 as mentioned earlier, which facilitates loosening the fastener 12 when a rotational torque is applied substantially simultaneously.

Referring now to FIGS. 8 and 9, further details of various embodiments of the horn 18 and the at least one replaceable tip socket, screwdriver bit, and/or torque bit tips 20 will be described relative to FIGS. 8 and 9. The inventors have found that the individual horns 18 may be configured and adapted to have a predetermined shape that is selected depending upon the acoustic effect and focus desired Different shapes affect the characteristics of the sonics through the horn such as horn amplitude, the resonance frequency, location of focused energy, internal stress of the horn. Different sizes are also needed for the different sized fasteners and also for fitting in different locations. Helix is a shape as well. In the illustrations being described, the inventors have found that different shapes cause the predetermined focus area 25 of the focused ultrasonic or acoustic energy to be adapted or changed depending on various parameter, such as the size and type of fastener 12, the length of the fastener 12, and the like. For ease of illustration, FIG. 8 shows five different embodiments of horns (18, 18*i*, 18*ii*, 18*iii*, 18*iv*), but it should be understood that other shapes and sizes of horns 18 with a predetermined working end socket, screwdriver bit, and/or torque bit tips may be selected as well and that these are only exemplary.

In the embodiment illustrated in FIG. 8, the fastener tool 16 comprises a plurality of horns, 18, 18*i*, 18*ii* and 18*iii* that are sized and adapted for a plurality of fasteners 12 that have a plurality of heads of different shapes or sizes, respectively. Note in FIG. 8 that a plurality of each of these shapes and sizes may be provided to accommodate fasteners 12 having heads/nuts 12*a* that are complementary in shape and size, respectively. Notice in FIG. 8 that each of the horns 18, 18*i*, 18*iv* each have an end that has an aperture or socket, screwdriver bit, and/or torque bit tip 19 in order to accommodate different shapes and sizes of heads 12*a* of different fasteners, respectively. Below each of the horns 18, 18*i*, 18*ii* and 18*iii* is shown illustrative ends of a plurality of horns 18, each of which having different apertures or sockets, screwdriver bits, and/or torque bit tips 19 to accommodate different shapes and sizes of heads 12*a* of the fasteners 12. Of course, more or fewer horns 18 may be provided. Thus, it should be understood that each of the horns 18, 18*i*, 18*ii* and 18*iii* is configured or adapted to provide a plurality of horns 18 that are sized and adapted for a plurality of different fasteners 12 that have a plurality of heads 12*a* of different shapes or sizes.

With respect to the horn 18*iv*, notice that the end does not have the socket, screwdriver bit, and/or torque bit tip 19, but rather, a flat area 31 for engaging a top surface of the head/nut. Although not shown, this horn 18*iv* is adapted to engage not only the head and/or nut 12*a*, but it could engage either end of the fastener 12, especially if the fastener 12 does not have a head and/or nut 12*a* of the type shown and described herein. This particular horn 18*iv* may also be used to engage a head and/or nut 12*a* and apply acoustic/ultrasonic energy into the fastener 12, without receiving the fastener head and/or nut 12*a*. The benefits of a flat horn 19 is for when a bolt/screw is in a place where the full socket cannot or will not fit over the bolt/screw head and/or nut, where one might need to use different torque applicator on the bolt/screw head and/or nut that is not the horn itself, or when access to the bolt/screw head and/or nut face and a nut is on an opposite side, where axis is to an end of the bolt/screw shank.

Referring now to FIG. 9, other embodiments are illustrated. In these embodiments, the horn 18 may be configured or adapted to receive a plurality of sockets, screwdriver bits, and/or torque bit tips 20, 20*i*, 20*ii*, 20*iii* and 20*iv* of different sizes so that the horn 18 may be used to apply the ultrasonic or acoustic energy into and through the socket, screwdriver bit, and/or torque bit tips 20 and into the fastener 12 when the fastener 12 is being tightened or loosened. Notice in the right-most portion of FIG. 9 that the horn 18 comprises a horn body 18*e* having a threaded projection 18*f* which is mounted into the threaded aperture 16*a*1 (FIG. 1) of the armature 16*a* of the fastener tool 16. The end 18*d* (FIG. 9) also comprises a threaded aperture 20*c* for receiving the threaded projection 20*a* of at least one of the sockets, screwdriver bits, and/or torque bit tips 20. Again, and similar to FIG. 8, notice that the sockets, screwdriver bits, and/or torque bit tips 20, 20*i*, 20*ii*, 20*iii* and 20*iv* each have the end 20*b* having the working apertures 20*c*, 20*ci*, 20*cii*, 20*ciii* and 20*civ* that is adapted and sized to receive and mate with the head and/or nut 12*a* of the fastener 12. As with the embodiments discussed earlier herein, the aperture 20*c* is adapted and sized to complement a shape of the head and/or nut 12*a* of the fastener 12. Again, the plurality of sockets or tips 20, 20*i*, 20*ii*, 20*iii* and 20*iv* may be provided in a set or kit to accommodate fasteners 12 of different shapes and sizes. As with the horn 18*iv* in FIG. 8, at least one socket, screwdriver bit, and/or torque bit tips 20*iv* may be provided with a flat area 33 for engaging at least a part or surface of the fastener 12.

As illustrated in FIG. 9, the horn 18 is threadably mounted onto the armature 16*a* (FIG. 1) and then at least one socket, screwdriver bit, and/or torque bit tip 20 is selected and then threadably mounted to the end 18*a* of the horn 18 as shown. Accordingly, after a user determines the fastener 12 that needs to be loosened or tightened, the user selects the appropriate socket, screwdriver bit, and/or torque bit tip 20, 20*i*, 20*ii*, 20*iii* and 20*iv* that mates with the head and/or nut 12*a* of the fastener 12. Alternatively, the user may select the socket, screwdriver bit, and/or torque bit tip 20*iv* if it was desired to use a tip with a flat end 33.

Advantageously, the at least one replaceable socket, screwdriver bit, and/or torque bit tip 20 comprises a plurality of interchangeable or replaceable tips or sockets of different sizes and shapes to accommodate fasteners 12 of different sizes and shapes, respectively, with at least one of the replaceable sockets or tips 20 being selected from the plurality of interchangeable or replaceable sockets or tips 20 during use of the system 10. During use, the sockets or tips 20, 20*ai*, 20*aii*, 20*aiii*, and 20*aiv* are threadably secured to the horn 18 when the threaded projection 20*a* is mounted into the threaded receiving area 20*c* as illustrated in FIG. 9. The horn 18 is then used to loosen or tighten the fastener as described herein.

Figures 10A, 10B:
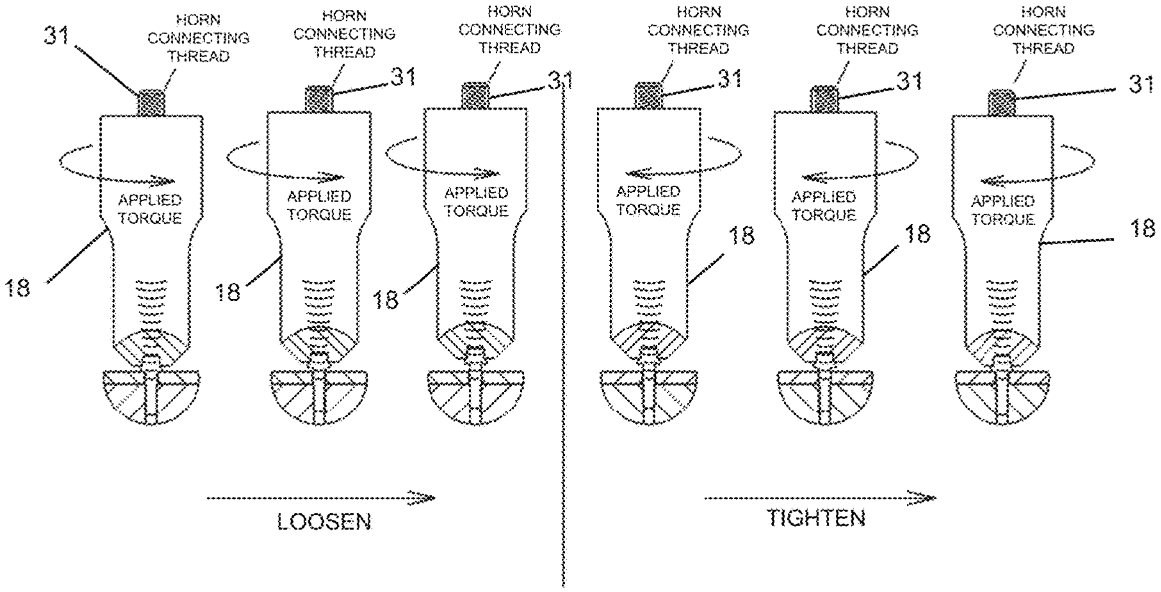
FIGS. 10A-10B illustrate an applied force during loosening or tightening, respectively.

Referring now to FIGS. 10A and 101B, notice the thread direction or thread handedness of the threaded projection 31 on the horn 18 (FIG. 8) and of threaded projection 20*a* in FIG. 9 are generally in a direction that is directly opposite of a thread direction of the fastener 12. In other words and as illustrated in FIG. 10A, if it is desired to loosen the fastener and rotate the horn 18 in a counter-clockwise direction, then the threads 31 of the horn 18 are provided in a clockwise direction. Alternatively, if the horn 18 is being applied to tighten a fastener 12 by rotating the fastener 12 in a clockwise direction, then the direction of the threads 31 on the horn 18 are in a counter-clockwise direction. One could also use a substantially larger threaded connector that is in the same direction but torqued much higher than the bolt/screw that is being unfastened. Either of these are to prevent the horn/horn tip from becoming unthreaded when applying sonic or acoustic energy.

Figure 11:
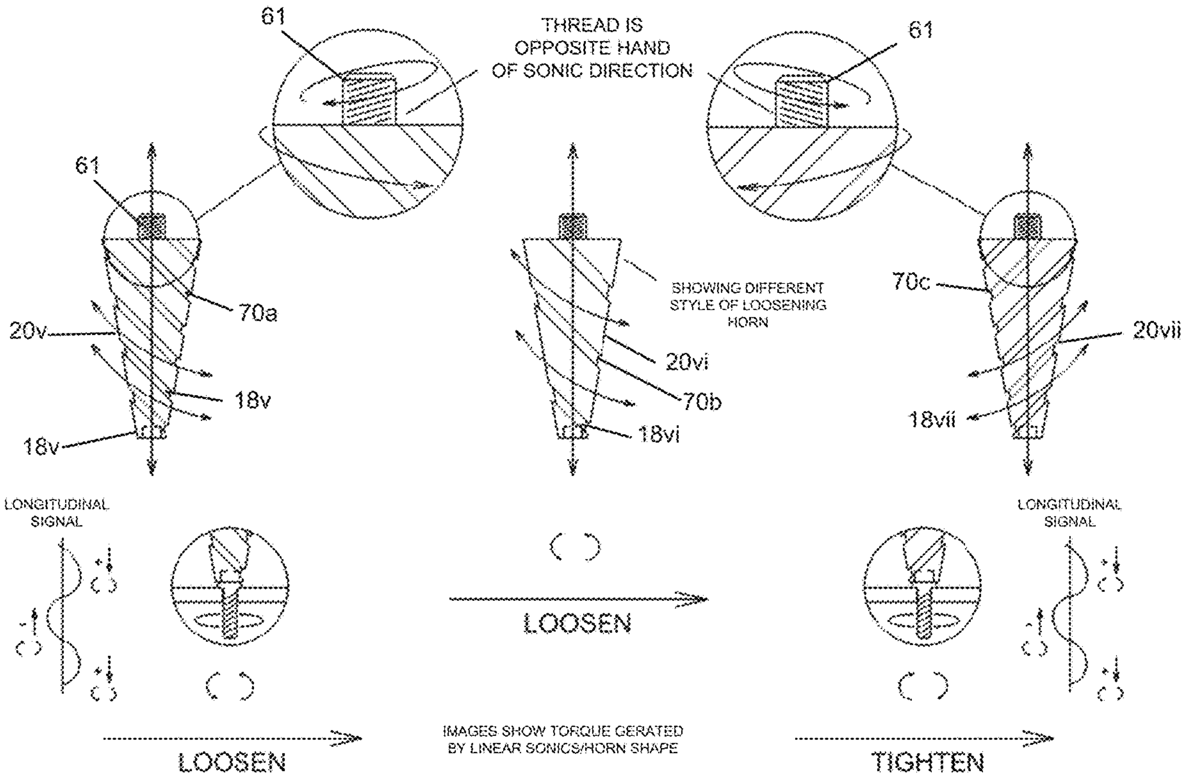
FIG. 11 is an illustration of a plurality of horns or tips that have a helical channel adapted to use a vortex within the fastener that facilitates loosening or tightening the fastener.
Figure 12:
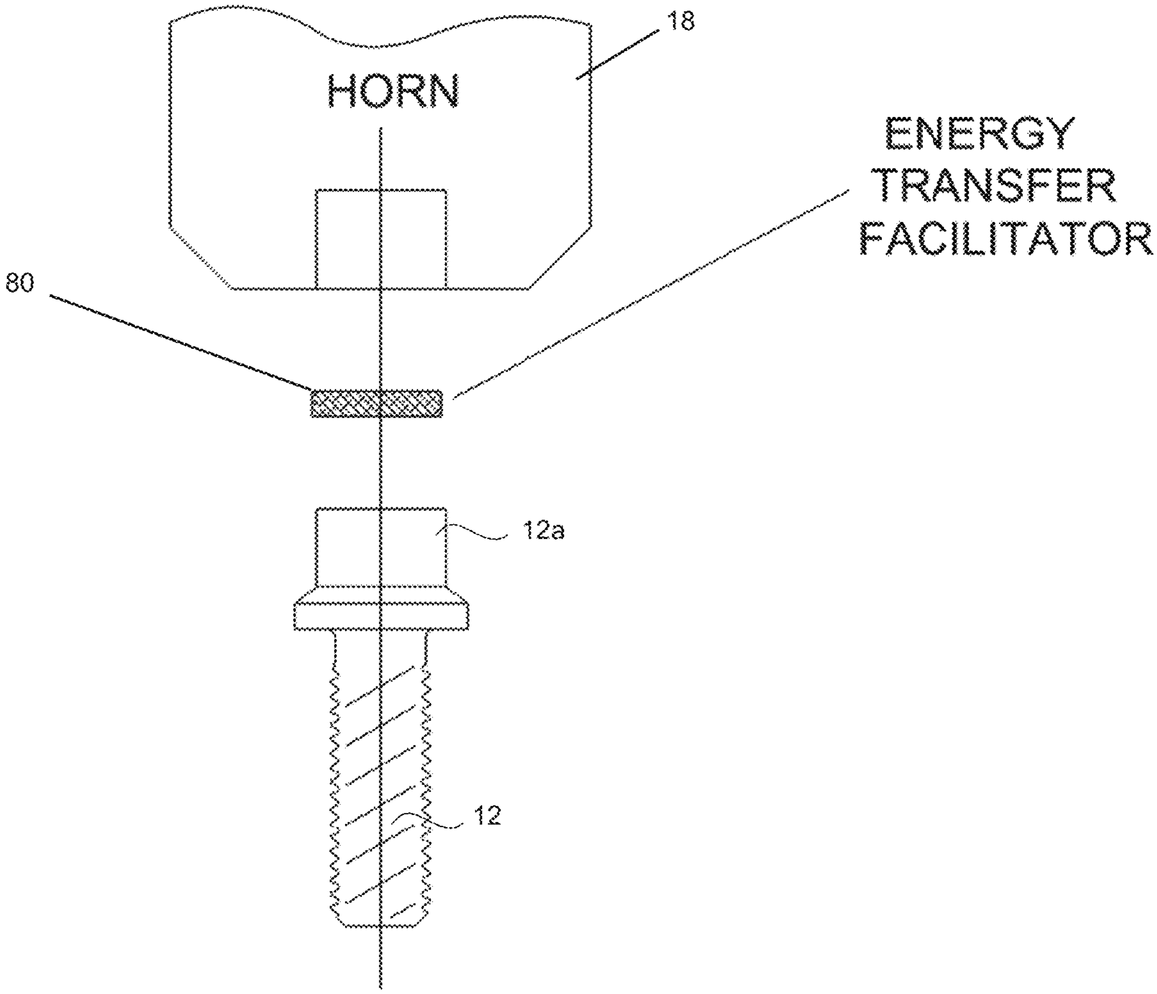
FIG. 12 is a view of the horn and fastener further illustrating an energy transfer facilitator for facilitating transfer of energy from the horn into the fastener.

FIG. 11 illustrates still another embodiment of possible horns 18 or sockets or tips 20*v*, 20*vi* and 20*vii*. For ease of illustration, FIG. 11 illustrates both a plurality of horns 18*v*, 18*vi* and 18*vii* and a plurality of sockets or tips 20*v*, 20*vi* and 20*vii* that are adapted to cause an acoustic or ultrasonic energy that causes a vortex or helical energy internally in the fastener 12 which, in turn, facilitates loosening or tightening the fastener 12. In this regard, the vortex or helical energy is selected to be in a predetermined direction which is defined by the shape of the horn 18, three of which are illustrated in FIG. 11. Note that the horns 18*v*, 18*vi* and 18*vii* or sockets or tips 20*v*, 20*vi* and 20*vii* are frusto-conical in shape and each comprise a helical groove 70*a*, 70*b* and 70*c*. FIG. 11 shows three illustrative embodiments of the horns 18*v*, 18*vi* and 18*vii*. Notice that the horns 18 or sockets or tips 20*v* and 20*vi* cause a counter-clockwise rotational vortex or helical application of energy to be applied to the screw. The thread of the threaded projection 20*a* has a thread direction that is opposite hand of the sonic direction caused by the vortex or helical energy. It should be understood that the vortex or helical energy travels into the fastener 12 and causes not only an elongation and shortening of the fastener 12 but also a slight rotational force or movement of the fastener 12 when the horn 18 is energized after it is placed on the head and/or nut 12*a* of the fastener 12.

In contrast, note that the horn 18*viii* or socket, screwdriver bit, and/or torque bit or tip 20*vii* has a helical groove 70*b* in a clockwise direction which causes an acoustic vortex or helical energy to apply a clockwise rotational and helical force to be applied to the fastener 12 which results in tightening the fastener 12 after the horns 18*v*, 18*vi*, 18*vii* or sockets or tips 20*v*, 20*vi* or 20*vii* are mounted to the horn 18.

Advantageously, the system 10 comprises at least one or a plurality of helical grooves 70*a*-70*c* that cause the acoustic/ultrasonic signal to vortex in a predetermined direction that is selected depending on whether or not the user wishes to loosen or tighten the fastener 12. For example, the vortex may be selected to be counter-clockwise for a right-handed threaded fastener 12 or clockwise for left-handed threaded fastener 12 to facilitate rotating the fastener 12 when the acoustic/ultrasonic signal passes therein to loosen it. Likewise, the vortex may be selected to be clockwise for a right-handed threaded fastener 12 or counter-clockwise for a left-handed threaded fastener 12 to facilitate rotating the fastener 12 when the acoustic/ultrasonic signal passes therein to tighten it.

During operation, the horn 18 and/or socket, screwdriver bit, and/or torque bit tips 20 are selected in response to the shape and size of the head and/or nut 12*a* of the fastener 12. The horn 18 is mounted to the armature 16*a*. Alternatively and for the embodiment illustrated in FIG. 9, the replaceable socket, screwdriver bit, and/or torque bit tips 20 is selected in response to the fastener head and/or nut 12*a* and mounted onto the horn 18 as mentioned earlier herein. To accommodate the sockets, screwdriver bits, and/or torque bit tips 20 illustrated in FIG. 9 or, similar to FIG. 8, the horns 18 or sockets, screwdriver bits, and/or torque bit tips 20 may be provided with the helical groove 70*a*, 70*b* or 70*c* as described earlier. Once the appropriate horn 18 and/or socket, screwdriver bit, and/or torque bit tip 20 is selected and assembled together as described herein and the horn 18 and/or socket, screwdriver bit, and/or torque bit tips 20 is mounted directly onto the head and/or nut 12*a* of the fastener 12. Thereafter, the acoustic/ultrasonic generator 14 is energized and causes the acoustic/ultrasonic input signal 14*a* to be applied to the horn 18 and/or socket, screwdriver bit, and/or torque bit tips 20 and then ultimately to create the focused energy at the predetermined focus area 25 in the fastener. In a preferred embodiment, the rotational torque applicator 40 described earlier herein is also energized or the wrench 42 is used manually to rotatably drive the fastener 12 substantially simultaneously as the acoustic/ultrasonic energy passes into the fastener 12.

To facilitate the energy transfer, the system 10 may comprise an energy transfer facilitator 80 (FIG. 12) for facilitating transferring the ultrasonic or acoustic energy from the horn 18 and into the fastener 12. In the illustration being described, the energy transfer facilitator 80 may comprise at least one of a fluid or material that is arranged between the horn 18 and the head and/or nut 12*a* of the fastener 12 or a socket, screwdriver bit, and/or torque bit tip that is mounted on the fastener 12. The fluid or material may absorb minimal acoustic energy while traveling into the fastener 12, but it has been found that the use of the energy transfer facilitator 80 does facilitate transferring the acoustic or ultrasonic energy into the fastener 12. In the illustration being described, the energy transfer facilitator 80 may comprise, but not limited to, Teflon, oil, water, gel, foam, glycol, glycerin, and/or a polymer film or a minimally absorbing spacer.

FIG. 13 illustrates still another embodiment of the horn 18 and a mating fastener 12. In this embodiment, it should be understood that the resonant frequency of the horn 18 corresponds to the resonant frequency of the fastener 12 which also facilitates the transfer of the ultrasonic or acoustic energy into the fastener 12. In FIG. 13 and in this illustration, the resonant frequencies are approximately similar in both the horn 18 and the fastener 12. The inventors have found that matching the resonant frequency of the horn 18 to the resonant frequency of the fastener 12 further facilitates loosening or tightening the fastener 12 as desired.

In FIG. 14 the inventors have found that the bolt head designs can be optimized to allow for transfer for acoustic energy. In this regard, the fastener heads may comprise predetermined characteristics, such as at least one of a concave end surface, a convex end surface or a flat end surface.

ADDITIONAL CONSIDERATIONS

Advantageously, one embodiment of this invention is that it removes the risk of breaking bolts; reduced manual labor;

reduced skilled labor. In other words, one would not need to be a skilled machinist to extract bolts which would reduce overall maintenance time.

Advantageously, one embodiment of this invention facilitates eliminating the need to drill out broken bolts and reduces risk of damage to engine/other components, which also removes possibility for debris to fall into the engine or undesirable locations through a drilled through hole.

Advantageously, another embodiment of this invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A fastener tool for loosening or tightening a fastener mounted on a structure, said fastener tool comprising:

a tool body;

a horn adapted and sized to apply an acoustic or ultrasonic energy into said fastener; and an acoustic/ultrasonic generator for generating said acoustic or ultrasonic energy that passes through said horn and into said fastener to facilitate fastening or loosening said fastener;

said acoustic/ultrasonic generator generating a signal of a frequency of at least 1 kHz;

wherein said fastener comprises an end that is directly or indirectly engaged by said horn during loosening or fastening when said acoustic or ultrasonic energy is applied thereto, said acoustic/ultrasonic generator generating said ultrasonic or acoustic energy that travels through said horn and into said fastener and becomes concentrated or focused at a predetermined target location in said fastener;

said predetermined target location being along a length of said fastener so that a friction between threads of said fastener and threads of a structure is at least partly reduced during loosening or tightening;

said predetermined target location of concentrated or focused energy being along a length of said fastener between a head and/or nut and an opposite end of said fastener, thereby facilitating reducing a breaking force necessary to loosen the fastener or a tightening force for tightening the fastener.

2. The fastener tool as recited in claim 1 wherein said horn comprises a generally flat surface for applying said acoustic or ultrasonic energy to said fastener.

3. The fastener tool as recited in claim 1 wherein said fastener tool comprises a rotational torque applicator for applying a rotational torque to said fastener while said ultrasonic or acoustic energy passes into said fastener;

wherein said rotational torque is at least one of mechanical torque or an acoustic/ultrasonic torque that is applied substantially simultaneously as said horn causes said acoustic or ultrasonic energy to pass into said fastener.

4. The fastener tool as recited in claim 3 wherein said horn is adapted to apply said rotational torque substantially simultaneously as said ultrasonic or acoustic energy passes into said fastener.

5. The fastener tool as recited in claim 1 wherein said horn comprises a socket, screwdriver bit, and/or torque bit sized and adapted to receive a head and/or nut of said fastener.

6. The fastener tool as recited in claim 1 wherein said end of said fastener comprises a mating end that mates with a head and/or nut that engages said structure at a head and/or nut engagement area of said structure when said fastener is mounted thereto, said predetermined location being in said fastener.

7. The fastener tool as recited in claim 1 wherein said end comprises a head and/or nut that becomes situated at a head and/or nut engagement area of the structure when said fastener is mounted thereto, said predetermined location being along a length of said fastener and downstream/upstream of said head and/or nut engagement area so that when said ultrasonic or acoustic energy is applied to said fastener, a friction or pressure between the head and/or nut mating surfaces and mating thread surfaces between said fastener and said structure is at least partly reduced.

8. The fastener tool as recited in claim 7 wherein the fastener comprises threads that mate with mating threads at a thread-engagement location, said the predetermined targeted location to be between the head and/or nut and its mating structure surface(s) along with the mating threads of the fastener and structure(s).

9. The fastener tool as recited in claim 8 wherein said the predetermined targeted location is between the head and/or nut and its mating structure surface(s) along with the mating threads of the fastener and structure(s).

10. The fastener tool as recited in claim 8 wherein said predetermined location is between said head and/or nut and a distal end of a bolt, and a first thread of mating female threads.

11. The fastener tool as recited in claim 1 wherein said fastener has a head and/or nut, said horn being adapted and sized to receive or engage said head and/or nut to apply a tightening or loosening torque to said head and/or nut when said acoustic or ultrasonic energy passes therethrough.

12. The fastener tool as recited in claim 11 wherein said horn comprises a socket, screwdriver bit, and/or torque bit tip that is sized and adapted to engage said head and/or nut and apply a rotational torque when said ultrasonic or acoustic energy passes into said fastener.

13. The fastener tool as recited in claim 11 wherein said fastener tool comprises a plurality of horns that are sized and adapted for a plurality of fasteners that have a plurality of heads, respectively, of different shapes or sizes.

14. The fastener tool as recited in claim 1 wherein said fastener tool comprises a plurality of horns that are sized and adapted for a plurality of fasteners that have a plurality of heads, respectively, of different shapes or sizes.

15. The fastener tool as recited in claim 1 wherein said horn is configured or adapted to receive a plurality of sockets, screwdriver bits, and/or torque bit tips of different sizes so that said horn may be used to apply said ultrasonic or acoustic energy directly into and through said socket, screwdriver bit, and/or torque bit tip and into said fastener when said fastener is being tightened or loosened.

16. The fastener tool as recited in claim 1 wherein said horn comprises;

a horn body;

at least one replaceable tip that is removably coupled to said horn body.

17. The fastener tool as recited in claim 16 wherein said fastener tool comprises a plurality of interchangeable or replaceable tips of different shapes or sizes to accommodate fasteners of different shapes or sizes, respectively, said at least one replaceable tip being selected from said plurality of interchangeable or replaceable tips.

18. The fastener tool as recited in claim 17 wherein at least one of said plurality of interchangeable or replaceable tips comprises a generally optimized geometry and or flat fastener-engaging surface.

19. The fastener tool as recited in claim 17 wherein at least one of said plurality of interchangeable or replaceable tips is adapted and shaped to cause said acoustic or ultrasonic energy to cause a vortex or helical energy to be applied internally to said fastener, said vortex or helical energy being in a predetermined direction.

20. The fastener tool as recited in claim 19 wherein said predetermined direction is at least one of opposite a thread direction of threads on said fastener when loosening said fastener or said thread direction is the same as thread direction of threads when it is desired to tighten said fastener.

21. The fastener tool as recited in claim 16 wherein said horn body comprises a plurality of replaceable tips to accommodate fasteners of different sizes.

22. The fastener tool as recited in claim 16 wherein said horn body is threaded and said at least one replaceable tip comprises mating threads, a thread direction of threads of said horn body being a direction opposite a thread direction of threads of said fastener.

23. The fastener tool as recited in claim 16 wherein said horn body is threaded and said at least one replaceable tip comprises mating threads, mating thread on the horn being of a larger diameter than the mating threads on said fastener.

24. The fastener tool as recited in claim 1 wherein said horn comprises a helical or frusto-conical surface for engaging said fastener to apply a longitudinal signal during loosening or tightening of said fastener.

25. The fastener tool as recited in claim 1 wherein said fastener tool comprises a rotational force generator that is separate from said acoustic/ultrasonic generator, said rotational force generator generates a rotational force to rotate said fastener as said acoustic/ultrasonic generator generates said acoustic or ultrasonic energy that passes into said fastener.

26. The fastener tool as recited in claim 1 wherein said horn comprises a fastener-engaging surface for engaging said fastener, said fastener engaging surface being adapted to create an energy vortex within said fastener that facilitates loosening or fastening said fastener.

27. The fastener tool as recited in claim 26 wherein said fastener is threaded, said fastener engaging surface comprises an energy vortex, said energy vortex comprising a direction of rotation that opposes a helical direction of said threads of said fastener.

28. The fastener tool as recited in claim 1 wherein said end comprises a head and/or nut that engages a mating surface at a head and/or nut engagement area where said head and/or nut engages the structure when said fastener is mounted thereto, said predetermined location being downstream/upstream of said head and/or nut engagement area so that when said ultrasonic or acoustic energy is applied to said fastener, a friction or pressure between said head and/or nut and said mating surface along with mating threads between the fastener and structure is at least partly reduced.

29. The fastener tool as recited in claim 1 wherein said fastener tool comprises an energy transfer facilitator for facilitating transferring said ultrasonic or acoustic energy into said fastener.

30. The fastener tool as recited in claim 29 wherein said energy transfer facilitator comprises at least one of a fluid or material is arranged between said horn and at least one of said fastener or a socket, screwdriver bit, and/or torque bit tips mounted on said fastener, said fluid or material absorbing a minimal amount of the acoustic or ultrasonic energy traveling into said fastener.

31. The fastener tool as recited in claim 30 wherein said energy transfer facilitator may comprise not limited to Teflon, oil, water, gel, foam, glycol, glycerin, and/or a polymer film or a minimally energy absorbing spacer.

32. The fastener tool as recited in claim 1 wherein said fastener is a bolt/screw and/or nut but not limited to an airplane component, large industrial, and/or automotive fastener for fastening at least two components together.

33. The fastener tool as recited in claim 1 wherein said horn comprises a predetermined resonant frequency selected to generally correspond to a fastener resonant frequency.

34. The fastener tool as recited in claim 1 wherein said fastener comprises at least one of a concave end surface, a convex end surface or a flat end surface.

35. A system for rotating a fastener that is fastened to a structure; said system comprising:

an acoustic/ultrasonic wave generator for generating an acoustic/ultrasonic signal that passes longitudinally through said fastener to elongate said fastener and to introduce a cyclic strain and heating within said fastener to reduce a frictional force between threads on said fastener and mating threads on said structure;

a tool having a horn for transmitting said acoustic/ultrasonic signal into said fastener; and wherein said acoustic/ultrasonic wave generator and said horn cooperate to focus or apply said acoustic/ultrasonic signal to a predetermined distance into said fastener in order to reduce a coefficient of friction between said fastener and said structure when said horn is in operative relationship with fastener and said acoustic/ultrasonic signal is applied thereto;

said acoustic/ultrasonic generator generating a signal of a frequency of at least 1 kHz;

wherein said fastener comprises an end that is directly or indirectly engaged by said horn during loosening or fastening when said acoustic or ultrasonic energy is applied thereto, said acoustic/ultrasonic generator generating said ultrasonic or acoustic energy that travels through said horn and into said fastener and becomes concentrated or focused at a predetermined target location in said fastener;

said predetermined target location being along a length of said fastener so that a friction between threads of said fastener and threads of a structure is at least partly reduced during loosening or tightening;

said predetermined target location of concentrated or focused energy being along a length of said fastener between said head and/or nut and an opposite end of said fastener, thereby facilitating reducing a breaking force necessary to loosen the fastener or a tightening force for tightening the fastener;

wherein an end of said fastener comprises a head and/or nut that becomes situated at a head and/or nut engagement area of the structure when said fastener is mounted thereto, a predetermined location being along a length of said fastener and downstream/upstream of said head and/or nut engagement area so that when said acoustic/ultrasonic signal is applied to said fastener, a friction or pressure between the head and/or nut and its mating surface is at least partly reduced.

36. The system as recited in claim 35 wherein said fastener comprises a head and/or nut having a shoulder (if present) that engages said structure at a shoulder engagement area of said structure, said predetermined distance being between the head and/or nut and its mating structure surface(s) along with the mating threads of the fastener and structure(s).

37. The system as recited in claim 36 wherein said predetermined distance being into said fastener between the head and/or nut and its mating structure surface(s) along with the mating threads of the fastener and structure(s).

38. The system as recited in claim 35 wherein the fastener comprises threads that mate with mating threads, said predetermined location between the head and/or nut and its mating structure surface(s) along with the mating threads of the fastener and structure(s).

39. The system as recited in claim 38 wherein said predetermined location is between the head and/or nut and its mating structure surface(s) along with the mating threads of the fastener and structure(s).

40. The system as recited in claim 35 wherein said system comprises a rotational torque applicator adapted to apply a rotational torque to said fastener substantially simultaneously as said acoustic/ultrasonic signal passes through said fastener.

41. The system as recited in claim 40 wherein said rotational torque applicator and said acoustic/ultrasonic wave generator are integrated into a common tool body.

42. The system as recited in claim 35 wherein said horn is sized and adapted to receive a head and/or nut or end of said fastener.

43. The system as recited in claim 35 wherein said horn is sized and adapted to receive a socket, screwdriver bit, and/or torque bit tip that is placed on a head and/or nut or end of said fastener to tighten or loosen said fastener, said socket, screwdriver bit, and/or torque bit tip receiving said acoustic/ultrasonic signal and causing it to pass into said fastener.

44. The system as recited in claim 35 wherein said horn comprises a socket, screwdriver bit, and/or torque bit tip that is sized and adapted to receive a head and/or nut of the fastener.

45. The system as recited in claim 35 wherein said fastener has a head and/or nut, said horn being adapted and sized to receive or engage said head and/or nut to apply a tightening or loosening torque to said head and/or nut when said acoustic/ultrasonic signal passes therethrough.

46. The system as recited in claim 45 wherein said horn comprises a socket, screwdriver bit, and/or torque bit tip that is sized and adapted to engage said head and/or nut and apply a rotational torque when said acoustic/ultrasonic signal passes into said fastener.

47. The system as recited in claim 35 wherein said system comprises a plurality of horns that are sized and adapted for a plurality of fasteners that have a plurality of heads, respectively, of different shapes or sizes.

48. The system as recited in claim 35 wherein said horn is configured or adapted to receive a plurality of sockets, screwdriver bits, and/or torque bit tips of different sizes so that said horn may be used to apply said acoustic/ultrasonic signal directly into and through said socket, screwdriver bit, and/or torque bit tips and into said fastener when said fastener is being tightened or loosened.

49. The system as recited in claim 35 wherein said horn comprises;

a horn body;

at least one replaceable tip removably coupled to said horn body.

50. The system as recited in claim 49 wherein said system comprises a plurality of interchangeable or replaceable tips of different shapes or sizes to accommodate fasteners of different shapes or sizes, respectively, said at least one replaceable tip being selected from said plurality of interchangeable or replaceable tips.

51. The system as recited in claim 50 wherein at least one of said plurality of interchangeable or replaceable tips comprises a generally optimized geometry and or flat fastener-engaging surface.

52. The system as recited in claim 51 wherein at least one of said plurality of interchangeable or replaceable tips is adapted and shaped to cause said acoustic/ultrasonic signal to cause a vortex or helical energy to be applied internally to said fastener, said vortex or helical energy being in a predetermined direction.

53. The system as recited in claim 52 wherein said predetermined direction is at least one of opposite a thread direction of threads on said fastener when loosening said fastener or said thread direction is the same as thread direction of threads when it is desired to tighten said fastener.

54. The system as recited in claim 49 wherein said horn body comprises a plurality of replaceable tips to accommodate fasteners of different sizes.

55. The system as recited in claim 49 wherein said horn body is threaded and said at least one replaceable tip comprises mating threads, a thread direction of the threads of said horn body being a direction opposite a thread direction of threads of said fastener.

56. The system as recited in claim 49 wherein said horn body is threaded and said at least one replaceable tip comprises mating threads, the horn body threaded diameter being larger than the said fastener threaded diameter.

57. The system as recited in claim 35 wherein said horn comprises a helical surface.

58. The system as recited in claim 35 wherein said horn comprises a helical surface that causes said acoustic/ultrasonic signal to vortex in a predetermined direction for either loosening or tightening said fastener.

59. The system as recited in claim 58 wherein said vortex is counterclockwise for a right-hand threaded fastener or clockwise for a left-hand threaded fastener to facilitate rotating said fastener when said acoustic/ultrasonic signal passes therein to loosen it.

60. The system as recited in claim 58 wherein said vortex is clockwise for a right-hand threaded fastener or counterclockwise for a left-hand threaded fastener to facilitate rotating said fastener when said acoustic/ultrasonic signal passes therein to tighten it.

61. The system as recited in claim 35 wherein said fastener comprises an end that is engaged by said horn during loosening or fastening, said acoustic/ultrasonic generator generating said acoustic/ultrasonic signal that travels into said fastener said predetermined distance and becomes concentrated or focused at a predetermined location in said fastener.

62. The system as recited in claim 61 wherein said end comprises a head and/or nut that engages a mating surface of said structure at a head and/or nut engagement area where said head and/or nut engages said structure when said fastener is mounted thereto, said predetermined location being downstream/upstream of said head and/or nut engagement area so that when said acoustic/ultrasonic signal is applied to said fastener, a friction or pressure between the head and/or nut and its mating surface(s) along with the mating threads of the fastener and structure(s) is at least partly reduced.

63. The system as recited in claim 61 wherein said fastener comprises a head and/or nut and a shoulder (if present) that engages a mating surface at a head and/or nut engagement area of said structure when said fastener is mounted thereto, said predetermined location between the head and/or nut and its mating structure surface(s) along with the mating threads of the fastener and structure(s).

64. The system as recited in claim 61 wherein said end comprises a head and/or nut that engages a surface at a head and/or nut engagement area where said head and/or nut engages a structure when said fastener is mounted thereto, said predetermined location being downstream/upstream of said head and/or nut engagement area so that when said acoustic/ultrasonic signal is applied to said fastener, a friction or pressure between the head and/or nut and its mating surface(s) along with the mating threads of the fastener and structure(s) is at least partly reduced.

65. The system as recited in claim 35 wherein said horn is configured or adapted to receive a plurality of sockets, screwdriver bits, and/or torque bit tips of different sizes so that said horn may be used to apply said acoustic/ultrasonic signal directly into and through said socket, screwdriver bit, and/or torque bit tips and into said fastener when said fastener is being tightened or loosened.

66. The system as recited in claim 35 wherein said fastener has a head and/or nut, said horn being adapted and sized to receive said head and/or nut to apply a tightening or fastening torque to said head and/or nut while said acoustic/ultrasonic signal passes therethrough.

67. The system as recited in claim 66 wherein said fastener is threaded, said fastener engaging surface comprises an energy vortex, said energy vortex comprising a direction of rotation that opposes a helical direction of said threads of said fastener.

68. The system as recited in claim 35 wherein said tool comprises a plurality of horns that are sized and adapted for a plurality of fasteners that have a plurality of heads, respectively, of different shapes or sizes.

69. The system as recited in claim 35 wherein said horn comprises a helical or frusto-conical surface for engaging said fastener to apply a rotational torsional signal or force during longitudinal vibration of said fastener so that both a longitudinal signal and a tortional signal and force are substantially simultaneously applied to said fastener during loosening or tightening of said fastener.

70. The system as recited in claim 35 wherein said acoustic/ultrasonic generator generates and applies said acoustic/ultrasonic signal, said tool comprising a rotational force generator that is separate from said acoustic/ultrasonic generator, said rotational force generator generates a tortional signal or force to rotate said fastener as said acoustic/ultrasonic generator generates said acoustic/ultrasonic signal passes into said fastener said predetermined distance.

71. The system as recited in claim 35 wherein said horn comprises a fastener-engaging surface for engaging said fastener, said fastener engaging surface being adapted to create an energy vortex within said fastener that facilitates loosening or tightening said fastener.

72. The system as recited in claim 35 wherein said system comprises an energy transfer facilitator for facilitating transferring said acoustic/ultrasonic signal into said fastener.

73. The system as recited in claim 72 wherein said energy transfer facilitator comprises at least one of a fluid or material is arranged between said horn and at least one of said fastener or a socket, screwdriver bit, and/or torque bit tips mounted on said fastener, said fluid or minimally absorbing material of said acoustic/ultrasonic signal traveling into said fastener.

74. The system as recited in claim 72 wherein said energy transfer facilitator may comprise but not limited to Teflon, oil, water, gel, foam, glycol, glycerin, and/or a polymer film or a minimally energy absorbing spacer.

75. The system as recited in claim 35 wherein said fastener may be but not limited to an airplane, industrial, and/or automotive component fastener for fastening at least two components together.

76. The system as recited in claim 35 wherein said horn comprises a predetermined resonant frequency selected to generally correspond to a fastener resonant frequency.

* * * * *